US012640831B2

(12) United States Patent
Hand et al.

(10) Patent No.: US 12,640,831 B2
(45) Date of Patent: May 26, 2026

(54) SYSTEMS AND METHODS FOR CONFIGURABLE LANE MAPPING FOR MUXPONDER MODULES

(71) Applicant: Infinera Corp., San Jose, CA (US)

(72) Inventors: Steven Joseph Hand, Los Gatos, CA (US); Norman Swenson, Mountain View, CA (US); Jeng Rong Yeh, San Mateo, CA (US)

(73) Assignee: Infinera Corporation, San Jose, CA (US)

( * ) Notice: Subject to any disclaimer, the term of this patent is extended or adjusted under 35 U.S.C. 154(b) by 274 days.

(21) Appl. No.: 18/313,836

(22) Filed: May 8, 2023

(65) Prior Publication Data

US 2023/0361903 A1      Nov. 9, 2023

Related U.S. Application Data

(60) Provisional application No. 63/338,940, filed on May 6, 2022.

(51) Int. Cl.
*H04J 3/16*      (2006.01)
*H04B 10/25*     (2013.01)
*H04Q 11/00*     (2006.01)

(52) U.S. Cl.
CPC ........ *H04J 3/1652* (2013.01); *H04B 10/2589* (2020.05); *H04Q 11/0062* (2013.01); *H04Q 2011/0088* (2013.01)

(58) Field of Classification Search
None
See application file for complete search history.

(56) References Cited

U.S. PATENT DOCUMENTS

| | | | |
|---|---|---|---|
| 8,155,531 B2 | 4/2012 | Murthy et al. | |
| 10,707,967 B1 * | 7/2020 | Hajduczenia | H04B 10/25 |
| 2015/0085877 A1 * | 3/2015 | Kono | H04L 49/208 370/467 |
| 2015/0236810 A1 * | 8/2015 | Fu | H04J 3/1658 398/79 |

* cited by examiner

*Primary Examiner* — Nathan M Cors
(74) *Attorney, Agent, or Firm* — Mendelsohn Dunleavy, P.C.; Steve Mendelsohn

(57)      ABSTRACT

Disclosed herein are methods and systems for dynamically configuring a muxponder. One exemplary system may be provided with a muxponder module deployed in an optical network, the muxponder having an optical receiver, a first and a second electrical port, a demultiplexer having a built-in digital cross-connect, and a processor accessing a mapping table to assign traffic streams associated with a first service identification code to a first and a second host lane of the first electrical port, traffic streams associated with a second service identification code to a third and a fourth host lane of the second electrical port, and having logic to control the digital cross-connect to route a first and a second traffic stream to the first electrical port based on the first service identification code, and a third and a fourth traffic stream to the second electrical port based on the second service identification code.

22 Claims, 10 Drawing Sheets

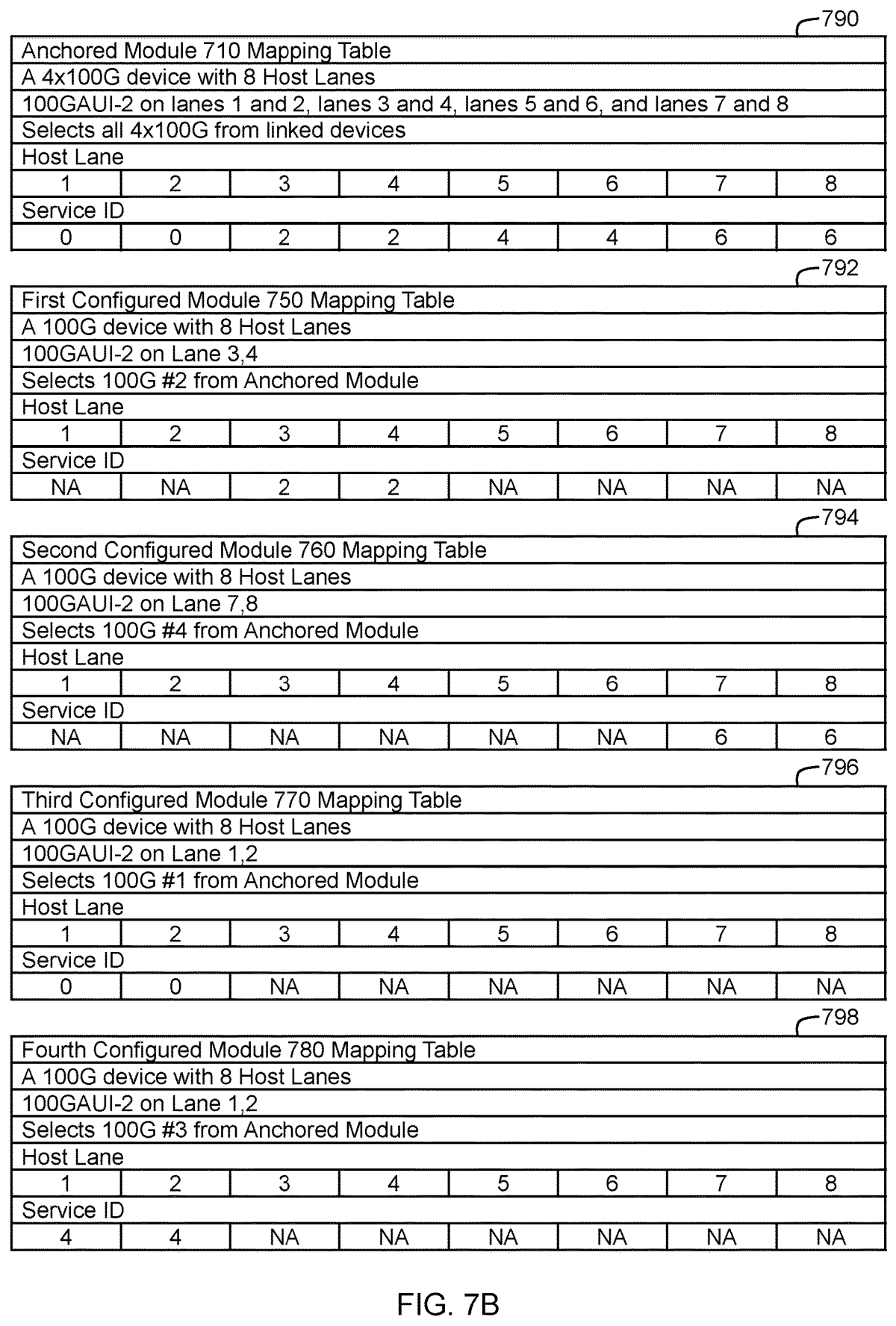

790

| Anchored Module 710 Mapping Table | | | | | | | |
|---|---|---|---|---|---|---|---|
| A 4x100G device with 8 Host Lanes | | | | | | | |
| 100GAUI-2 on lanes 1 and 2, lanes 3 and 4, lanes 5 and 6, and lanes 7 and 8 | | | | | | | |
| Selects all 4x100G from linked devices | | | | | | | |
| Host Lane | | | | | | | |
| 1 | 2 | 3 | 4 | 5 | 6 | 7 | 8 |
| Service ID | | | | | | | |
| 0 | 0 | 2 | 2 | 4 | 4 | 6 | 6 |

792

| First Configured Module 750 Mapping Table | | | | | | | |
|---|---|---|---|---|---|---|---|
| A 100G device with 8 Host Lanes | | | | | | | |
| 100GAUI-2 on Lane 3,4 | | | | | | | |
| Selects 100G #2 from Anchored Module | | | | | | | |
| Host Lane | | | | | | | |
| 1 | 2 | 3 | 4 | 5 | 6 | 7 | 8 |
| Service ID | | | | | | | |
| NA | NA | 2 | 2 | NA | NA | NA | NA |

794

| Second Configured Module 760 Mapping Table | | | | | | | |
|---|---|---|---|---|---|---|---|
| A 100G device with 8 Host Lanes | | | | | | | |
| 100GAUI-2 on Lane 7,8 | | | | | | | |
| Selects 100G #4 from Anchored Module | | | | | | | |
| Host Lane | | | | | | | |
| 1 | 2 | 3 | 4 | 5 | 6 | 7 | 8 |
| Service ID | | | | | | | |
| NA | NA | NA | NA | NA | NA | 6 | 6 |

796

| Third Configured Module 770 Mapping Table | | | | | | | |
|---|---|---|---|---|---|---|---|
| A 100G device with 8 Host Lanes | | | | | | | |
| 100GAUI-2 on Lane 1,2 | | | | | | | |
| Selects 100G #1 from Anchored Module | | | | | | | |
| Host Lane | | | | | | | |
| 1 | 2 | 3 | 4 | 5 | 6 | 7 | 8 |
| Service ID | | | | | | | |
| 0 | 0 | NA | NA | NA | NA | NA | NA |

798

| Fourth Configured Module 780 Mapping Table | | | | | | | |
|---|---|---|---|---|---|---|---|
| A 100G device with 8 Host Lanes | | | | | | | |
| 100GAUI-2 on Lane 1,2 | | | | | | | |
| Selects 100G #3 from Anchored Module | | | | | | | |
| Host Lane | | | | | | | |
| 1 | 2 | 3 | 4 | 5 | 6 | 7 | 8 |
| Service ID | | | | | | | |
| 4 | 4 | NA | NA | NA | NA | NA | NA |

FIG. 7B

First Configured Module 850 Mapping Table

A 100G device with 8 Host Lanes

100CAUI-4 on Lane 1,2,3,4

Selects 100G #4 from Anchored Module

| Host Lane | 1 | 2 | 3 | 4 | 5 | 6 | 7 | 8 |
|---|---|---|---|---|---|---|---|---|
| Service ID | 6 | 6 | 6 | 6 | NA | NA | NA | NA |

Anchored Module 710 Mapping Table

A 4x100G device with 8 Host Lanes

100GAUI-2 on lanes 1 and 2, lanes 3 and 4, lanes 5 and 6, and lanes 7 and 8

Selects all 4x100G from linked devices

| Host Lane | 1 | 2 | 3 | 4 | 5 | 6 | 7 | 8 |
|---|---|---|---|---|---|---|---|---|
| Service ID | 0 | 0 | 2 | 2 | 4 | 4 | 6 | 6 |

SYSTEMS AND METHODS FOR CONFIGURABLE LANE MAPPING FOR MUXPONDER MODULES

CROSS-REFERENCE TO RELATED APPLICATION

This application claims priority to U.S. Provisional Patent Application No. 63/338,940, filed May 6, 2022, titled "Configurable Lane Mapping for CMIS Modules", the content of which is incorporated herein by reference in its entirety.

BACKGROUND

Optical networking is a communication means that utilizes signals encoded in light to transmit information, e.g., data, as an optical signal in various types of telecommunications networks. Optical networking may be used in relatively short-range networking applications such as in a local area network (LAN) or in long-range networking applications, such as those spanning countries, continents, and/or oceans. Generally, optical networks utilize optical amplifiers, a light source such as lasers or light emitting diodes (LEDs), and wavelength division multiplexing to enable high-bandwidth communication.

Muxponders are network modules that aggregate multiple services for optical transmission. Muxponders may be configured to operate following the Common Management Interface Specification (CMIS) version 5.2, published April 2022, which is a standard promulgated by the Optical Internetworking Forum (OIF) that is directed toward management of several different kinds of modules for optical fiber and copper cable interconnects. CMIS provides application instance configuration based on fixed physical media lane configuration.

Under the CMIS standard, there is a pre-defined mapping from host lane to host lane, in order to associate data across modules to route the data to its desired destination. For instance, data originating from host lane 1 on a sending module is automatically mapped to host lane 1 on a receiving module. Under current configurations, this assigned mapping cannot be changed, because for each application where a module, or modules, support multiple application instances, a host needs to be able to determine which host lane or host lane group corresponds to which media lane group for each possible application instance in the module.

However, such "fixed" mapping can be problematic. For example, fixed mapping is limited by the number of physical connections. In a point to multi-point network, for instance, a physical optical port is needed for each host lane group connection. Further, the fixed mapping cannot be changed in response to a problem, such as with the lanes of the receiving module. Additionally, currently, modules cannot be dynamically configured to map data traffic to desired host lanes that are not the matching lane to the sending module lane.

SUMMARY OF THE INVENTION

The presently disclosed inventive concepts solve the problems of fixed mapping by providing systems and methods for configurable lane mapping for muxponder modules for transport networks. In one implementation, the problems of fixed mapping in associated network modules are solved by enabling dynamic host lane mapping, which allows a network operator to dynamically map host lanes in a host lane group on a first network element to a desired host lane group on a second network element as disclosed herein.

In one implementation, an optical transport network system, may comprise: an anchor muxponder module, comprising: a first electrical port having a first host lane receiving a first traffic stream and a second host lane receiving a second traffic stream, the first host lane having a first electrical register, and the second host lane having a second electrical register; a second electrical port having a third host lane receiving a third traffic stream and a fourth host lane receiving a fourth traffic stream, the third host lane having a third electrical register and the fourth host lane having a fourth electrical register; wherein the first electrical register of the first host lane and the second electrical register of the second host lane are associated with a first service identification code, and the third electrical register of the third host lane and the fourth electrical register of the fourth host lane are associated with a second service identification code; and at least one optical transmitter configured to transmit the first traffic stream, the second traffic stream, the third traffic stream, and the fourth traffic stream; at least one configured muxponder module comprising: at least one optical receiver configured to receive the first traffic stream, the second traffic stream, the third traffic stream, and the fourth traffic stream; a first configured electrical port having a first configured host lane associated with a first configured electrical register and a second configured host lane associated with a second configured electrical register; a second configured electrical port having a third configured host lane associated with a third configured electrical register and a fourth configured host lane associated with a fourth configured electrical register; a digital cross-connect; and a configured processor accessing a mapping table to assign traffic streams associated with the first service identification code to the first configured host lane and the second configured host lane of the first configured electrical port, traffic streams associated with the second service identification code to the third configured host lane and the fourth configured host lane of the second configured electrical port, and having logic to control the digital cross-connect to route the first traffic stream and the second traffic stream to the first configured electrical port based on the first service identification code, and the third traffic stream and the fourth traffic stream to the second configured electrical port based on the second service identification code; and a fiber optic link connecting the least one optical transmitter of the anchor module to the at least one optical receiver of the configured module, wherein said fiber optic link is configured to transmit the first traffic stream, the second traffic stream, the third traffic stream, and the fourth traffic stream.

The optical transport network system, wherein the anchor muxponder module further comprises: a third electrical port having a fifth host lane receiving a fifth traffic stream and a sixth host lane receiving a sixth traffic stream, the fifth host lane having a fifth electrical register, and the sixth host lane having a second electrical register, wherein the fifth electrical register of the fifth host lane and the sixth electrical register of the sixth host lane are associated with a third service identification code; and a fourth electrical port having a seventh host lane receiving a seventh traffic stream and an eighth host lane receiving an eighth traffic stream, the seventh host lane having a seventh electrical register and the eighth host lane having a eighth electrical register, wherein the seventh electrical register of the seventh host lane and the eighth electrical register of the eighth host lane are associated with a fourth service identification code; and wherein the at least one configured muxponder module further comprises: a third configured electrical port having a fifth configured host lane associated with a fifth configured electrical register and a sixth configured host lane associated with a sixth configured electrical register; a fourth configured electrical port having a seventh configured host lane associated with a seventh configured electrical register and an eighth configured host lane associated with an eighth configured electrical register; and wherein the configured processor accessing the mapping table assigns traffic streams associated with the third service identification code to the fifth configured host lane and the sixth configured host lane of the third electrical port, and traffic associated with the fourth service identification code to the seventh configured host land and the eight configured host lane associated with the fourth electrical port, and the logic to controlling the digital cross-connect routes the fifth traffic stream and the sixth traffic stream to the third configured electrical port based on the third service identification code, and the seventh traffic stream and the eight traffic stream to the fourth configured electrical port based on the fourth service identification code.

The optical transport network system, wherein the at least one optical receiver comprises a first optical receiver and a second optical receiver, and wherein the at least one configured muxponder module comprises: a first configured muxponder module comprising the first optical receiver, a first digital cross-connect, and the first electrical port, the first optical receiver receiving the first traffic stream and the second traffic stream; and a second configured muxponder module comprising the second configured optical receiver, a second digital cross-connect, and the second configured electrical port, the second configured optical receiver receiving the third traffic stream and the fourth traffic stream.

The optical transport network system, wherein the anchor muxponder module further comprises a multiplexer, the multiplexer configured to combine the first traffic stream, the second traffic stream, the third traffic stream, and the fourth traffic as a combined traffic stream and pass the combined traffic stream to the at least one optical transmitter, the at least one optical transmitter configured to convert the combined traffic stream to at least one combined optical signal and provide the at least one combined optical signal to the fiber optic link.

The optical transport network system, further comprising an optical splitter connected to the fiber optic link, the optical splitter configured to receive the at least one combined optical signal from the at least one optical transmitter and split the at least one combined optical signal to form at least one split optical signal.

The optical transport network system, wherein the first configured muxponder module further comprises a first demultiplexer, the second configured muxponder module further comprises a second demultiplexer, and the at least one split optical signal comprises a first split optical signal directed to the first configured muxponder module and a second split optical signal direct to the second configured muxponder module, each of the first split optical signal and the second split optical signal comprising the first traffic stream, the second traffic stream, the third traffic stream, and the fourth traffic stream; wherein the first configured muxponder module is configured to receive, at the first optical receiver, the first split optical signal, demultiplex, with the first demultiplexer the first split optical signal into the first traffic stream, the second traffic stream, the third traffic stream, and the fourth traffic stream, and route, with the first digital cross connect accessing a first mapping table, the first traffic stream and the second traffic stream to the first configured electrical port; and wherein the second configured muxponder module is configured to receive, at the second optical receiver, the second split optical signal, demultiplex, with the second demultiplexer the second split optical signal into the first traffic stream, the second traffic stream, the third traffic stream, and the fourth traffic stream, and route, with the second digital cross connect accessing a second mapping table, the third traffic stream and the fourth traffic stream to the second configured electrical port.

In one implementation, an optical transport network system, may comprise: a configured muxponder module, comprising: an optical receiver configured to receive a combined optical signal comprising a first traffic stream, a second traffic stream, a third traffic stream, and a fourth traffic stream; a first configured electrical port having a first configured host lane associated with a first configured electrical register and a second configured host lane associated with a second configured electrical register; a second configured electrical port having a third configured host lane associated with a third configured electrical register and a fourth configured host lane associated with a fourth configured electrical register; a demultiplexer having a built-in digital cross-connect configured to demultiplex the combined optical signal into the first traffic stream, the second traffic stream, the third traffic stream, and the fourth traffic stream; and a configured processor accessing a mapping table to assign traffic streams associated with a first service identification code to the first configured host lane and the second configured host lane of the first configured electrical port, traffic streams associated with a second service identification code to the third configured host lane and the fourth configured host lane of the second configured electrical port, and having logic to control the digital cross-connect to route the first traffic stream and the second traffic stream to the first configured electrical port based on the first service identification code, and the third traffic stream and the fourth traffic stream to the second configured electrical port based on the second service identification code.

The optical transport network system, further comprising an anchor muxponder module, comprising: a first electrical port having a first host lane receiving the first traffic stream and a second host lane receiving the second traffic stream, the first host lane having a first electrical register, and the second host lane having a second electrical register; a second electrical port having a third host lane receiving the third traffic stream and a fourth host lane receiving the fourth traffic stream, the third host lane having a third electrical register and the fourth host lane having a fourth electrical register; wherein the first electrical register of the first host lane and the second electrical register of the second host lane are associated with the first service identification code, and the third electrical register of the third host lane and the fourth electrical register of the fourth host lane are associated with the second service identification code; and at least one optical transmitter configured to transmit the first traffic stream, the second traffic stream, the third traffic stream, and the fourth traffic stream as the combined optical signal.

The optical transport network system, wherein the anchor muxponder module further comprises a multiplexer, the multiplexer configured to combine the first traffic stream, the second traffic stream, the third traffic stream, and the fourth traffic into a combined traffic stream and pass the combined traffic stream to the at least one optical transmitter, the at least one optical transmitter configured to convert the combined traffic stream to the combined optical signal and provide the combined optical signal to a fiber optic link.

The optical transport network system, further comprising an optical splitter connected to the fiber optic link, the optical splitter configured to receive the combined optical signal from the at least one optical transmitter and split the combined optical signal to form at least one split optical signal.

The optical transport network system, wherein the anchor muxponder module further comprises: a third electrical port having a fifth host lane receiving a fifth traffic stream and a sixth host lane receiving a sixth traffic stream, the fifth host lane having a fifth electrical register, and the sixth host lane having a second electrical register, wherein the fifth electrical register of the fifth host lane and the sixth electrical register of the sixth host lane are associated with a third service identification code; a fourth electrical port having a seventh host lane receiving a seventh traffic stream and an eighth host lane receiving an eighth traffic stream, the seventh host lane having a seventh electrical register and the eighth host lane having a eighth electrical register; wherein the seventh electrical register of the seventh host lane and the eighth electrical register of the eighth host lane are associated with a fourth service identification code; and wherein the configured muxponder module further comprises: a third configured electrical port having a fifth configured host lane associated with a fifth configured electrical register and a sixth configured host lane associated with a sixth configured electrical register; a fourth configured electrical port having a seventh configured host lane associated with a seventh configured electrical register and an eighth configured host lane associated with an eighth configured electrical register; and wherein the configured processor accessing the mapping table assigns traffic streams associated with the third service identification code to the fifth configured host lane and the sixth configured host lane of the third electrical port, and traffic associated with the fourth service identification code to the seventh configured host land and the eight configured host lane associated with the fourth electrical port, and the logic to controlling the digital cross-connect routes the fifth traffic stream and the sixth traffic stream to the third configured electrical port based on the third service identification code, and the seventh traffic stream and the eight traffic stream to the fourth configured electrical port based on the fourth service identification code.

The optical transport network system, wherein the anchor muxponder module further comprises a multiplexer, the multiplexer configured to combine the first traffic stream, the second traffic stream, the third traffic stream, the fourth traffic stream, the fifth traffic stream, the sixth traffic stream, the seventh traffic stream, and the eighth traffic stream into a combined traffic stream and pass the combined traffic stream to the at least one optical transmitter, the at least one optical transmitter configured to convert the combined traffic stream to the combined optical signal and provide the combined optical signal to a fiber optic link.

The optical transport network system, further comprising an optical splitter connected to the fiber optic link, the optical splitter configured to receive the combined optical signal from the at least one optical transmitter and split the combined optical signal to form at least one split optical signal, each at least one split optical signal comprising the first traffic stream, the second traffic stream, the third traffic stream, the fourth traffic stream, the fifth traffic stream, the sixth traffic stream, the seventh traffic stream, and the eighth traffic stream.

The optical transport network system, wherein the configured muxponder module is a first configured muxponder module and the system further comprises a second configured muxponder module, and wherein the at least one split optical signal comprises a first split optical signal directed to the first configured muxponder module and a second split optical signal directed to the second configured muxponder module.

In one implementation, a method, may comprise: receiving, with an optical receiver of a muxponder, a combined optical data stream including a first traffic stream, a second traffic stream, a third traffic stream, and a fourth traffic stream, the first traffic stream and the second traffic stream associated with a first service identification code, the third traffic stream and the fourth traffic stream associated with a second service identification code; and controlling, by a processor of the muxponder, a digital cross-connect to route the first traffic stream to a first electrical register and the second traffic stream to a second electrical register based on the first service identification code, and the third traffic stream to a third electrical register and the fourth traffic stream to a fourth electrical register based on the second service identification code.

The method, wherein first traffic stream, the second traffic stream, the third traffic stream, and the fourth traffic stream are transmitted from an optical transmitter of an anchor muxponder module.

The method, wherein the processor of the muxponder accesses a mapping table to determine how to route the first traffic stream to the first electrical register and the second traffic stream to the second electrical register based on the first service identification code, and the third traffic stream to the third electrical register and the fourth traffic stream to the fourth electrical register based on the second service identification code.

The method, wherein after receiving the combined optical data stream, the combined optical data stream is demultiplexed into the first traffic stream, the second traffic stream, the third traffic stream, and the fourth traffic stream.

The method, wherein the first, second, third, and fourth traffic streams are transmitted from the anchor muxponder module after the anchor muxponder module has accessed a mapping table and assigned the first service identification code to the first traffic stream and the second traffic stream, and the second service identification code to the third traffic stream and the fourth traffic stream.

The method, wherein the first traffic stream and the second traffic stream have a first combined capacity and the third traffic stream and the fourth traffic stream have a second combined capacity that is different than the first combined capacity.

Implementations of the above techniques include methods, apparatus, systems, networks, and computer program products. One such computer program product is suitably embodied in a non-transitory machine-readable medium that stores instructions executable by one or more processors. The instructions are configured to cause the one or more processors to perform the above-described actions.

The details of one or more implementations of the subject matter of this specification are set forth in the accompanying drawings and the description below. Other aspects, features, and advantages will become apparent from the description, the drawings, and the claims.

BRIEF DESCRIPTION OF THE DRAWINGS

The accompanying drawings, which are incorporated in and constitute a part of this specification, illustrate one or more implementations described herein and, together with the description, explain these implementations. The drawings are not intended to be drawn to scale, and certain features and certain views of the figures may be shown exaggerated, to scale, or in schematic in the interest of clarity and conciseness. Not every component may be labeled in every drawing. Like reference numerals in the figures may represent and refer to the same or similar element or function. In the drawings:

FIGS. 7A-1, 7A-2, and 7B illustrate an exemplary point to multi-point transport network having an anchor module and multiple configured modules, each with an associated mapping table that assign traffic streams to host lanes constructed in accordance with the present disclosure.

DETAILED DESCRIPTION

Figure 1:
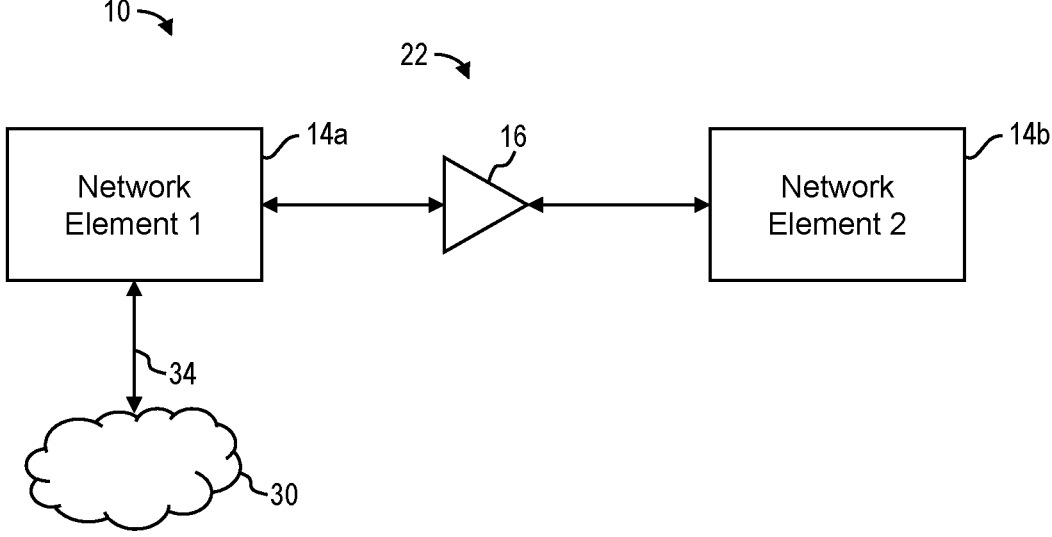
FIG. 1 is a block diagram of an exemplary implementation of a transport network constructed in accordance with the present disclosure.

The following detailed description of exemplary embodiments refers to the accompanying drawings. The same reference numbers in different drawings may identify the same or similar elements.

Before explaining at least one embodiment of the disclosure in detail, it is to be understood that the disclosure is not limited in its application to the details of construction, experiments, exemplary data, and/or the arrangement of the components set forth in the following description or illustrated in the drawings unless otherwise noted.

The disclosure is capable of other embodiments or of being practiced or carried out in various ways. Also, it is to be understood that the phraseology and terminology employed herein are for purposes of description and should not be regarded as limiting.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the inventive concept. This description should be read to include one or more and the singular also includes the plural unless it is obvious that it is meant otherwise. Further, use of the term "plurality" is meant to convey "more than one" unless expressly stated to the contrary.

As used herein, qualifiers like "about," "approximately," and combinations and variations thereof, are intended to include not only the exact amount or value that they qualify, but also some slight deviations therefrom, which may be due to manufacturing tolerances, measurement error, wear and tear, stresses exerted on various parts, and combinations thereof, for example.

The use of the term "at least one" or "one or more" will be understood to include one as well as any quantity more than one. In addition, the use of the phrase "at least one of X, Y, and Z" will be understood to include X alone, Y alone, and Z alone, as well as any combination of X, Y, and Z.

The use of ordinal number terminology (i.e., "first", "second", "third", "fourth", etc.) is solely for the purpose of differentiating between two or more items and, unless explicitly stated otherwise, is not meant to imply any sequence or order or importance to one item over another or any order of addition.

As used herein, any reference to "one embodiment," "an embodiment," "some embodiments," "one implementation," "some implementations," "an implementation," "one example," "for example," or "an example" means that a particular element, feature, structure, or characteristic described in connection with the embodiment/implementation/example is included in at least one embodiment/implementation/example and may be used in conjunction with other embodiments/implementations/examples. The appearance of the phrase "in some embodiments" or "one example" or "in some implementations" in various places in the specification does not necessarily all refer to the same embodiment/implementation/example, for example.

Circuitry, as used herein, may be analog and/or digital components referred to herein as "blocks", or one or more suitably programmed processors (e.g., microprocessors) and associated hardware and software, or hardwired logic. Also, "components" or "blocks" may perform one or more functions. The term "component" or "block" may include hardware, such as a processor (e.g., a microprocessor), a combination of hardware and software, and/or the like. Software may include one or more processor-executable instructions that when executed by one or more components cause the component to perform a specified function. It should be understood that the algorithms described herein may be stored on one or more non-transitory memory. Exemplary non-transitory memory may include random access memory, read-only memory, flash memory, and/or the like. Such non-transitory memory may be electrically based, optically based, and/or the like.

Software may include one or more processor-readable instruction that when executed by one or more component, e.g., a processor, causes the component to perform a specified function. It should be understood that the algorithms described herein may be stored on one or more non-transitory processor-readable medium, which is also referred to herein as a non-transitory memory. Exemplary non-transitory processor-readable mediums may include random-access memory (RAM), a read-only memory (ROM), a flash memory, and/or a non-volatile memory such as, for example, a CD-ROM, a hard drive, a solid-state drive, a flash drive, a memory card, a DVD-ROM, a Blu-ray Disk, a disk, and an optical drive, combinations thereof, and/or the like. Such non-transitory processor-readable media may be electrically based, optically based, magnetically based, and/or the like. Further, the messages described herein may be generated by the components and result in various physical transformations.

As used herein, the terms "network-based," "cloud-based," and any variations thereof, are intended to include the provision of configurable computational resources on demand via interfacing with a computer and/or computer network, with software and/or data at least partially located on a computer and/or computer network.

The generation of laser beams for use as optical data channel signals is explained, for example, in U.S. Pat. No. 8,155,531, entitled "Tunable Photonic Integrated Circuits", issued Apr. 10, 2012, and U.S. Pat. No. 8,639,118, entitled "Wavelength division multiplexed optical communication system having variable channel spacings and different modulation formats," issued Jan. 28, 2014, which are hereby fully incorporated in their entirety herein by reference.

As used herein, an "optical communication path" and/or an "optical route" may correspond to an optical path and/or an optical light path. For example, an optical communication path may specify a path along which light is carried between two or more network entities along a fiber optic link, e.g., an optical fiber.

As used herein, a transmission line segment (which may be referred to as an optical link or an optical multiplex section) is the portion of a transmission line from a first node (e.g., a first muxponder) transmitting a transmission signal to a second node (e.g., a second muxponder) receiving the transmission signal. The transmission line segment may include one or more optical in-line amplifier situated between the first node and the second node. In some implementations, an optical multiplex section (OMS) has the same scope as the transmission line segment (TLS). In some implementations, the OMS may be a subset of a TLS.

Referring now to the drawings, and in particular to FIG. 1, shown therein is a diagram of an exemplary implementation of a transport network 10 constructed in accordance with the present disclosure. The transport network 10 is depicted as having a plurality of network elements 14a-n, including a first network element 14a and a second network element 14b. Though two network elements 14 are shown for the purposes of illustration, it will be understood that the plurality of network elements 14a-n may comprise more or fewer network elements 14. Data transmitted within the transport network 10 may be transmitted along optical paths formed by a first transmission line segment 22 (which may also be referred to as "media lane 22"). The transport network 10 may be provided with one or more optical in-line amplifiers (ILA) disposed in the transmission line segment 22 such as ILA 16. Though a single transmission line segment 22 is shown, it will be understood that the transport network 10 may comprise additional transmission line segments 22, such as between additional network elements 14.

In one implementation, a user may interact with a computer system 30, e.g., via a user device, that may be used to communicate with one or more of the network elements 14a-n (hereinafter "network element 14") via a communication channel 34. Each element of the computer system 30 may be partially or completely network-based or cloud-based, and may or may not be located in a single physical location.

In some implementations, the computer system 30 is connected to one or more network element 14 via the communication channel 34. In this way, the computer system 30 may communicate with each of the one or more network element 14, and may, via the communication channel 34 transmit or receive data from each of the one or more network element 14. In other embodiments, the computer system 30 may be integrated into each network element 14 and/or may communicate with one or more pluggable card within the network element 14. In some embodiments, the computer system 30 may be a remote network element.

The communication channel 34 may permit bi-directional communication of information and/or data between the computer system 30 and/or the network elements 14 of the transport network 10. The communication channel 34 may interface with the computer system 30 and/or the network elements 14 in a variety of ways. For example, in some embodiments, the communication channel 34 may interface by optical and/or electronic interfaces, and/or may use a plurality of network topographies and/or protocols including, but not limited to, Ethernet, TCP/IP, circuit switched path, combinations thereof, and/or the like. The communication channel 34 may utilize a variety of network protocols to permit bi-directional interface and/or communication of data and/or information between the computer system 30 and/or the network elements 14.

The communication channel 34 may be a network connection. For example, in some embodiments, the communication channel 34 may be a version of an Internet network (e.g., exist in a TCP/IP-based network). In one embodiment, the communication channel 34 is the Internet. It should be noted, however, that the communication channel 34 may be almost any type of network and may be implemented as the World Wide Web (or Internet), a local area network (LAN), a wide area network (WAN), a metropolitan network, a wireless network, a cellular network, a Bluetooth network, a Global System for Mobile Communications (GSM) network, a code division multiple access (CDMA) network, a 3G network, a 4G network, an LTE network, a 5G network, a satellite network, a radio network, an optical network, a cable network, a public switched telephone network, an Ethernet network, combinations thereof, and/or the like.

If the communication channel 34 is the Internet, a primary user interface of the computer system 30 may be delivered through a series of web pages or private internal web pages of a company or corporation, which may be written in hypertext markup language, JavaScript, or the like, and accessible by the user. It should be noted that the primary user interface of the computer system 30 may be another type of interface including, but not limited to, a Windows-based application, a tablet-based application, a mobile web interface, a VR-based application, an application running on a mobile device, and/or the like. In one embodiment, the communication channel 34 may be connected to one or more of the user devices, computer system 30, and the network elements 14a-n.

The transport network 10 may be, for example, made up of interconnected individual nodes (that is, the network elements 14). The transport network 10 may include any type of network that uses light as a transmission medium. For example, the transport network 10 may include a fiber-optic based network, an optical transport network, a light-emitting diode network, a laser diode network, an infrared network, a wireless optical network, a wireless network, combinations thereof, and/or other types of optical networks.

The number of devices and/or networks illustrated in FIG. 1 is provided for explanatory purposes. In practice, there may be additional devices and/or networks, fewer devices and/or networks, different devices and/or networks, or differently arranged devices and/or networks than are shown in FIG. 1. Furthermore, two or more of the devices illustrated in FIG. 1 may be implemented within a single device, or a single device illustrated in FIG. 1 may be implemented as multiple, distributed devices. Additionally, or alternatively, one or more of the devices of the transport network 10 may perform one or more functions described as being performed by another one or more of the devices of the transport network 10. Devices of the computer system 30 may interconnect via wired connections, wireless connections, or a combination thereof. For example, in one embodiment, the user device and the computer system 30 may be integrated into the same device, that is, the user device may perform functions and/or processes described as being performed by the computer system 30, described below in more detail.

Figure 2:
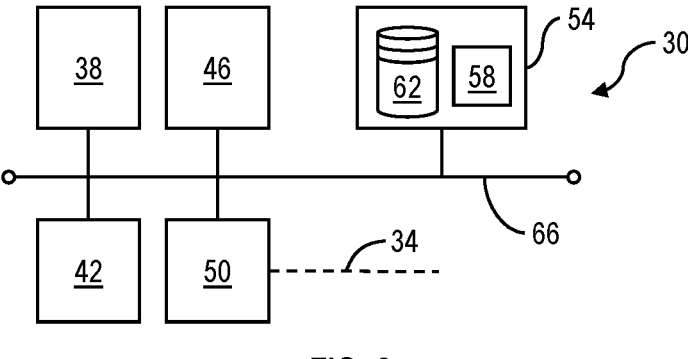
FIG. 2 is a diagram of an exemplary implementation of a computer system shown in FIG. 1 and constructed in accordance with the present disclosure.

Referring now to FIG. 2, shown therein is a diagram of an exemplary embodiment of the computer system 30 constructed in accordance with the present disclosure. In some embodiments, the computer system 30 may include, but is not limited to, implementations as a pluggable computer housed in a network chassis, a personal computer, a cellular telephone, a smart phone, a network-capable television set, a tablet, a laptop computer, a desktop computer, a network-capable handheld device, a server, a digital video recorder, a wearable network-capable device, a virtual reality/augmented reality device, and/or the like.

In some embodiments, the computer system 30 may include one or more input devices 38 (hereinafter "input device 38"), one or more output devices 42 (hereinafter "output device 42"), one or more processors 46 (hereinafter "processor 46"), one or more communication devices 50 (hereinafter "communication device 50") capable of interfacing with the communication channel 34, one or more non-transitory processor-readable medium (hereinafter "computer system memory 54") storing processor-executable code and/or software application(s) 58, for example including, a web browser capable of accessing a website and/or communicating information and/or data over a wireless or wired network (e.g., the communication channel 34), and/or the like, and a database 62. The input device 38, the output device 42, the processor 46, the communication device 50, and the computer system memory 54 may be connected via a path 66 such as a data bus that permits communication among the components of the computer system 30.

In some implementations, the processor 46 may comprise one or more processor 46 working together, or independently, to read and/or execute processor executable code and/or data, such as stored in the computer system memory 54. The processor 46 may be capable of creating, manipulating, retrieving, altering, and/or storing data structures into the computer system memory 54. Each element of the computer system 30 may be partially or completely network-based or cloud-based, and may or may not be located in a single physical location.

Exemplary implementations of the processor 46 may include, but are not limited to, a digital signal processor (DSP), a central processing unit (CPU), a field programmable gate array (FPGA), a microprocessor, a multi-core processor, an application specific integrated circuit (ASIC), combinations, thereof, and/or the like, for example. The processor 46 may be capable of communicating with the computer system memory 54 via the path 66 (e.g., data bus).

The processor 46 may be capable of communicating with the input device 38 and/or the output device 42.

The processor 46 may be further capable of interfacing and/or communicating with the network elements 14 via the communication channel 34 using the communication device 50. For example, the processor 46 may be capable of communicating via the communication channel 34 by exchanging signals (e.g., analog, digital, optical, and/or the like) via one or more ports (e.g., physical or virtual ports) using a network protocol to provide information to the one or more network element 14.

The computer system memory 54 may store a software application 58 that, when executed by the processor 46, causes the computer system 30 to perform an action such as communicate with, or control, one or more component of the computer system 30, the transport network 10 (e.g., the one or more network element 14a-n), and/or the communication channel 34.

In some implementations, the computer system memory 54 may have a data store that may store data such as network element version information, firmware version information, sensor data, system data, metrics, logs, tracing, and the like in a raw format as well as transformed data that may be used for tasks such as reporting, visualization, analytics, signal routing, power loading operations and/or coordination, etc. The data store may include structured data from relational databases, semi-structured data, unstructured data, time-series data, and binary data. The data store may be a database, a remote accessible storage, or a distributed filesystem. In some embodiments, the data store may be a component of an enterprise network.

In some implementations, the computer system memory 54 may be located in the same physical location as the computer system 30, and/or one or more computer system memory 54 may be located remotely from the computer system 30. For example, the computer system memory 54 may be located remotely from the computer system 30 and communicate with the processor 46 via the communication channel 34. Additionally, when more than one computer system memory 54 is used, a first computer system memory may be located in the same physical location as the processor 46, and additional computer system memory may be located in a location physically remote from the processor 46. Additionally, the computer system memory 54 may be implemented as a "cloud" non-transitory processor-readable storage memory (i.e., one or more of the computer system memories 54 may be partially or completely based on or accessed using the communication channel 34).

In one implementation, the database 62 may be a time-series database, a relational database or a non-relational database. Examples of such databases comprise, DB2®, Microsoft® Access, Microsoft® SQL Server, Oracle®, mySQL, PostgreSQL, MongoDB, Apache Cassandra, InfluxDB, Prometheus, Redis, Elasticsearch, TimescaleDB, and/or the like. It should be understood that these examples have been provided for the purposes of illustration only and should not be construed as limiting the presently disclosed inventive concepts. The database 62 can be centralized or distributed across multiple systems.

The input device 38 may be capable of receiving information input from the user, another computer, and/or the processor 46, and transmitting such information to other components of the computer system 30 and/or the communication channel 34. The input device 38 may include, but is not limited to, implementation as a keyboard, a touchscreen, a mouse, a trackball, a microphone, a camera, a fingerprint reader, an infrared port, a slide-out keyboard, a flip-out keyboard, a cell phone, a PDA, a remote control, a fax machine, a wearable communication device, a network interface, combinations thereof, and/or the like, for example.

The output device 42 may be capable of outputting information in a form perceivable by the user, another computer system, and/or the processor 46. For example, implementations of the output device 42 may include, but are not limited to, a computer monitor, a screen, a touch-screen, a speaker, a website, a television set, a smart phone, a PDA, a cell phone, a fax machine, a printer, a laptop computer, a haptic feedback generator, a network interface, combinations thereof, and the like, for example. It is to be understood that in some exemplary embodiments, the input device 38 and the output device 42 may be implemented as a single device, such as, for example, a touchscreen of a computer, a tablet, or a smartphone. It is to be further understood that as used herein the term "user" is not limited to a human being, and may comprise a computer, a server, a website, a processor, a network interface, a user terminal, a virtual computer, combinations thereof, and/or the like, for example.

In general, the network element 14 transmits and receives data traffic and control signals. Nonexclusive examples of implementations of the network element 14 include a mux-ponder, optical line terminals (OLTs), optical cross connects (OXCs), optical line amplifiers, optical add/drop multiplexer (OADMs) and/or reconfigurable optical add/drop multiplex-ers (ROADMs), interconnected by way of optical fiber links.

Figure 3:
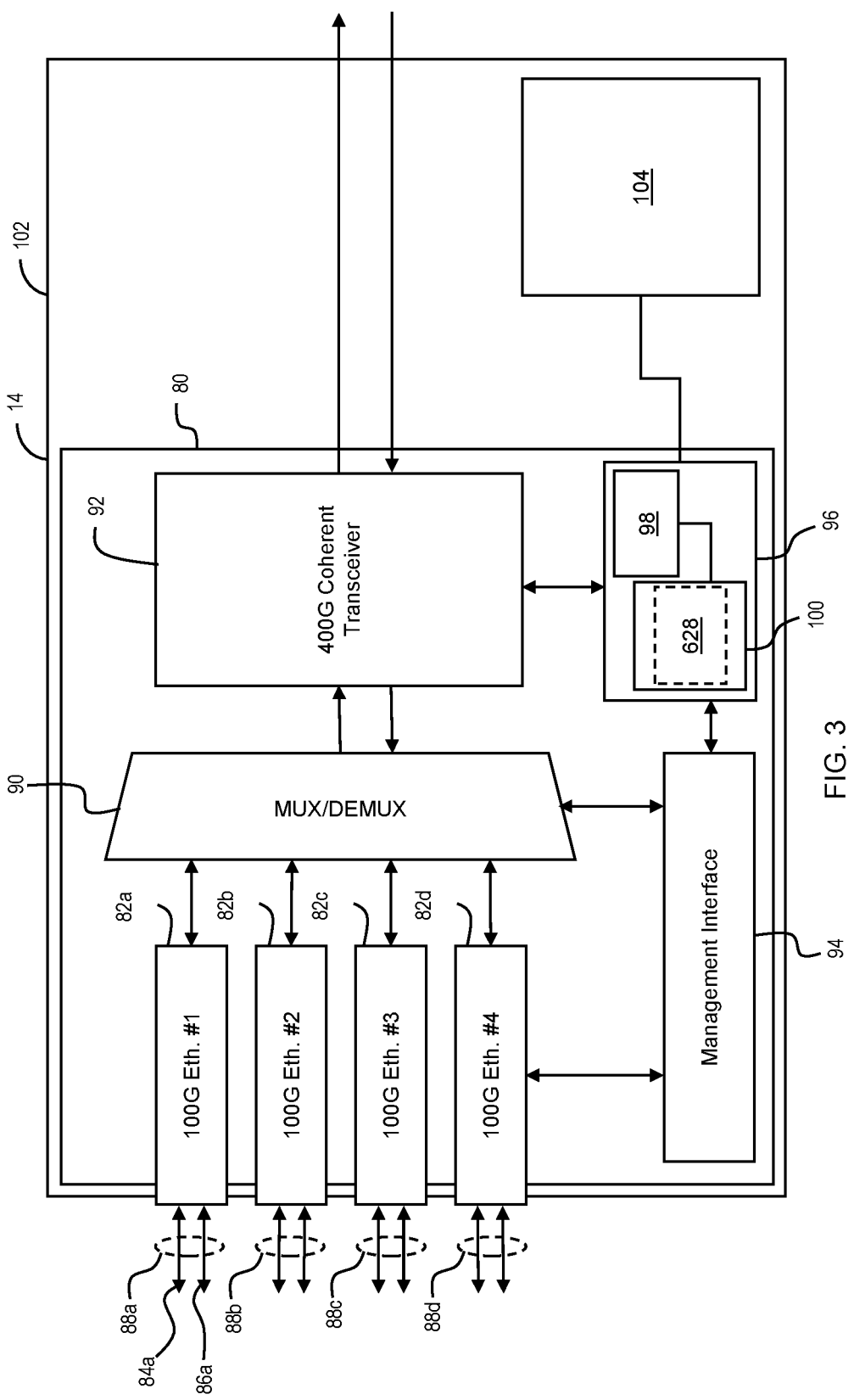
FIG. 3 is a block diagram of an exemplary implementation of a network element being a muxponder constructed in accordance with the present disclosure.

Referring now to FIG. 3, shown therein is a block diagram of an exemplary implementation of the network element 14 constructed in accordance with the present disclosure. In the implementation illustrated in FIG. 3, the network element 14 may be, or may be provided with, a muxponder 80. The muxponder 80 may be configured to aggregate multiple electrical network services, such as Ethernet, SONET/SDH, Fibre Channel, HD/SD-SDI, OTU2/3/4, etc., into an optical signal or signals. The muxponder 80 may be provided with a plurality of electrical ports 82a-n (illustrated for exemplary purposes as a first electrical port 82a, a second electrical port 82b, a third electrical port 82c, and a fourth electrical port 82d), each of the electrical ports 82a-82n having an asso-ciated first electrical register 84a-n (which may also be referred to as a first host lane or host lane 1, only one of which is labeled in FIG. 3 for clarity) and a second electrical register 86a-n (which may be referred to as a second host lane or host lane 2, only one of which is labeled in FIG. 3 for clarity), the associated first electrical register 84a-n and second electrical register 86a-n as a pair may be referred to as a host lane group and are assigned a service identification code 88a-88n (referred to herein as service ID 88a-88n). It should be noted, however, that other terms besides "service identification" and/or "service ID" may be used to identify host lanes and/or host lane groups. For instance, in some implementations, "cross-connect identification" and/or "cross-connect ID" may be used. In some implementations, "service identification" and/or "service ID" may be used on one side of a transmission line segment and "cross-connect identification" and/or "cross-connect ID" may be used on the other side of the transmission line segment.

In some implementations, the muxponder 80 may further comprise a multiplexer/demultiplexer 90, an optical trans-ceiver 92, a management interface 94, and/or a controller 96. The controller 96 may be provided with a mux processor 98 and non-transitory computer readable memory 100 (herein-after "mux memory 100") storing information such as a mapping table 628.

The processor 98 executing an application and/or the mapping table 628 stored in mux memory 100 may become a special-purpose machine particularly suited for performing various actions, operations, analyses, and/or the like in accordance with the systems and methods described herein and illustrated in the FIGS. 3, 6, 7, 8, and 9.

In the illustrated implementation, the electrical ports 82a-82n are shown each having a 100 gigabit capacity. In such an implementation, each of the first electrical register 84a-n and the second electrical register 86a-n would have a 50 gigabit capacity. An exemplary implementation of the electrical ports 82a-82n includes, but is not limited to implementation as a 100GAUI-2 electrical interface.

The muxponder 80 may be hardwired and/or programmed to receive electrical data signals via the electrical ports 82a-82n (which may be referred to as a "host side"), aggregate or multiplex the data signals in the multiplexer/demultiplexer 90, and transmit an optical signal containing the aggregated data via the optical transceiver 92 over the transmission line segment 22 (which may be referred to as a "media side"). The optical transceiver 92 may be provided with a local oscillator laser, optical hybrids, and photodiodes that operate in a known manner to provide electrical signals to an ADC (which may be included in an ASIC), which, in turn, provides digital signals or samples to a DSP. A trans-mission side of the optical transceiver 92 may be provided with modulators, modulator driver circuitry, and lasers. The DSP may include DAC circuits that convert digital signals from the DSP into analog signals, which are supplied to the modulator driver circuitry.

In some implementations, the network element 14 may be a chassis system 102 and the muxponder 80 maybe a line card inserted in or part of the chassis system 102. The chassis system 102 may be provided with a controller 104 which may be comprised of similar elements as computer system 30.

In FIG. 3, the muxponder 80 is illustrated as a 400 gigabit module having four 100 gigabit electrical ports 82a-82d. However, is should be noted that in other implementations, the muxponder 80 may be provided having any capacity. For instance, the muxponder 80 may be an 800 gigabit module having eight electrical ports 82 with each electrical port 82 having a 100 gigabit capacity. In another exemplary imple-mentation, the muxponder 80 may be an 800 gigabit module having five electrical ports 82 with four of the electrical ports having a 100 gigabit capacity and one of the electrical ports having a 400 gigabit capacity.

Figure 4:
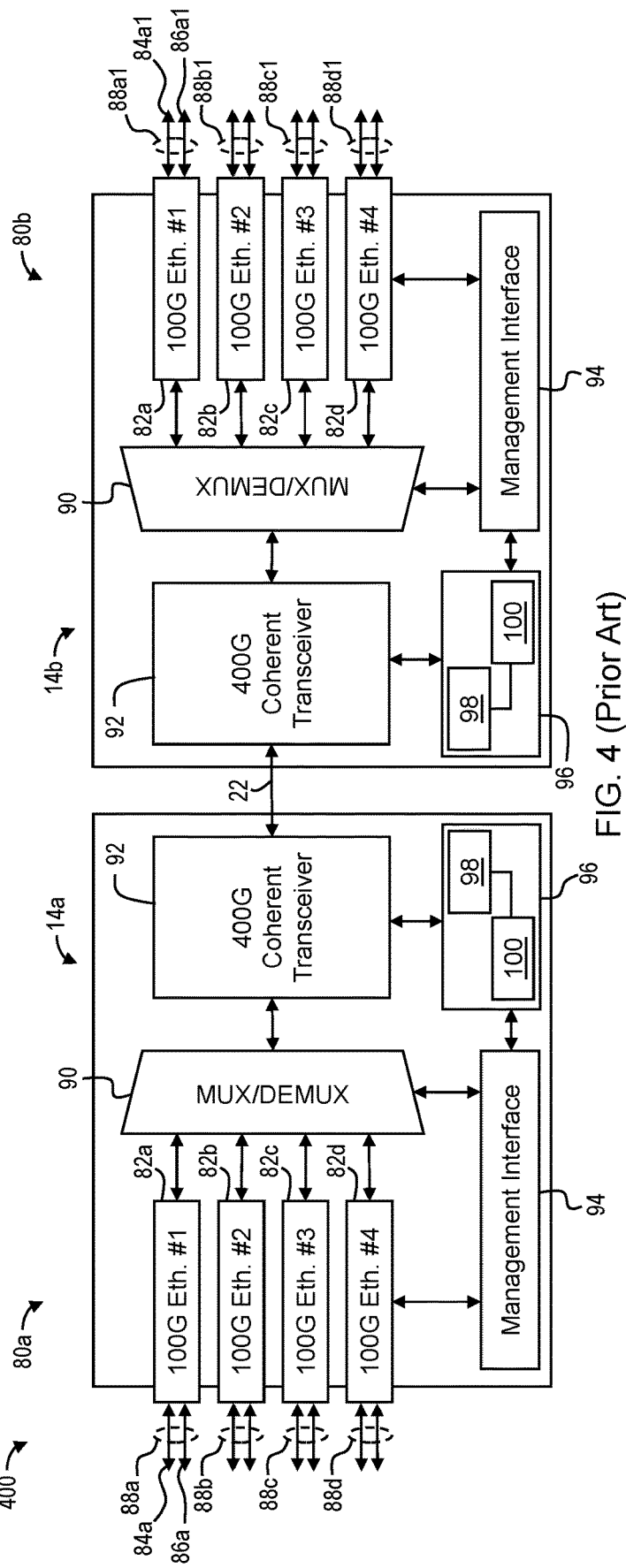
FIG. 4 is a block diagram of an exemplary prior art transport network.

Referring now to FIG. 4, shown therein is a prior art transport network 200 implemented according to methods presently used in the art. One exemplary prior art method uses the Common Management Interface Specification (CMIS) which is a standard directed toward management of several different kinds of modules for optical fiber and copper cable interconnects. CMIS provides application-instance configuration based on fixed physical media lane configuration. In FIG. 4, the transport network 200 is implemented using coherent technology that aggregates all incoming data signals and transmits them via one tunable laser over a single fiber. For the purposes of illustration, network element 14a will be referred to as a sending module and network element 14b will be referred to as a receiving module.

The CMIS standard requires a pre-defined host lane to host lane mapping. For instance, data originating from host lane 1 (electrical register 84a) and host lane 2 (electrical register 84b) together comprising a host lane group and identified by a first host service ID 88a on the sending module 14a are automatically mapped to host lane 1 (electrical register 84a1) and host lane 2 (electrical register 84b1) together comprising a first receiving service ID 88a1 on the receiving module 14b. Likewise, data originating from a second host service ID 88b is mapped to a second receiving service ID 88b1, data originating from a third host service ID 88c is mapped to a third receiving service ID 88c1, and data originating from a fourth host service ID 88d is mapped to a fourth receiving service ID 88d1. This assigned mapping cannot be changed. For each application where a module or modules support multiple application instances (such as first and second network elements 14a and 14b, for example), a host uses this fixed mapping to be able to determine which host lane or host lane group corresponds to which media lane group for each possible application instance in the module.

Figure 5:
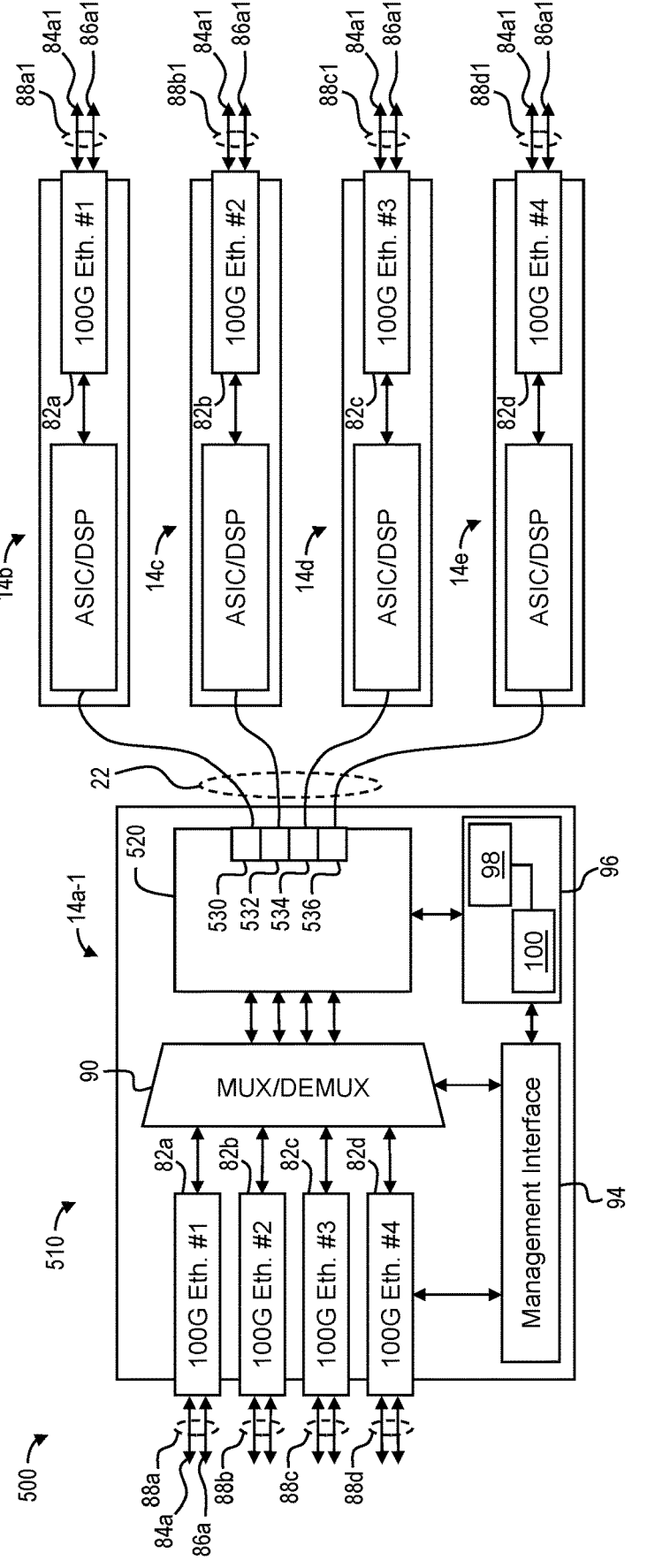
FIG. 5 is a block diagram of another exemplary prior art transport network.
Figure 6:
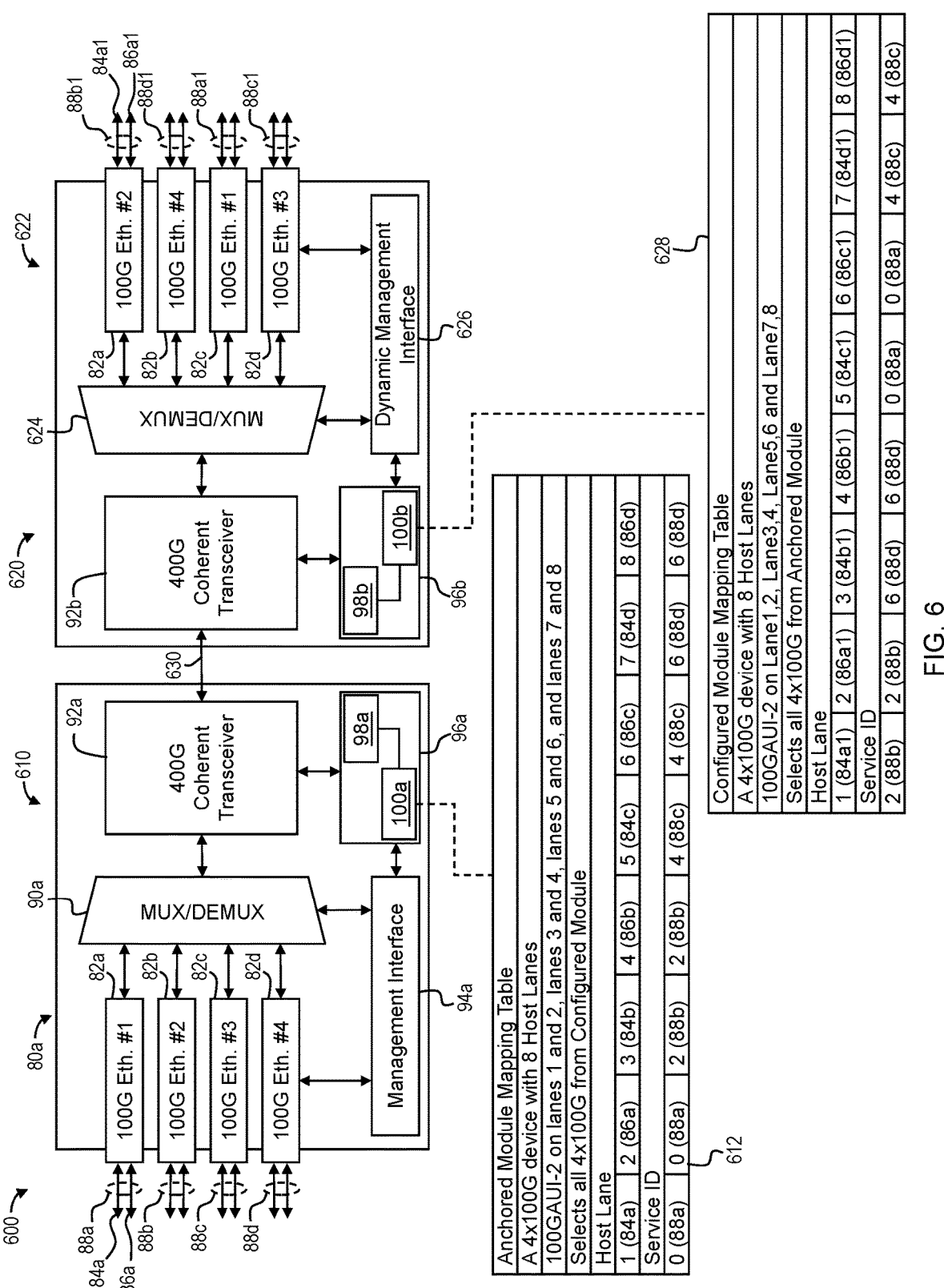
FIG. 6 is a diagram of an exemplary implementation of a transport network having an anchor module and a configured module each with an associated mapping table constructed in accordance with the present disclosure.
Figures 1, 7A:
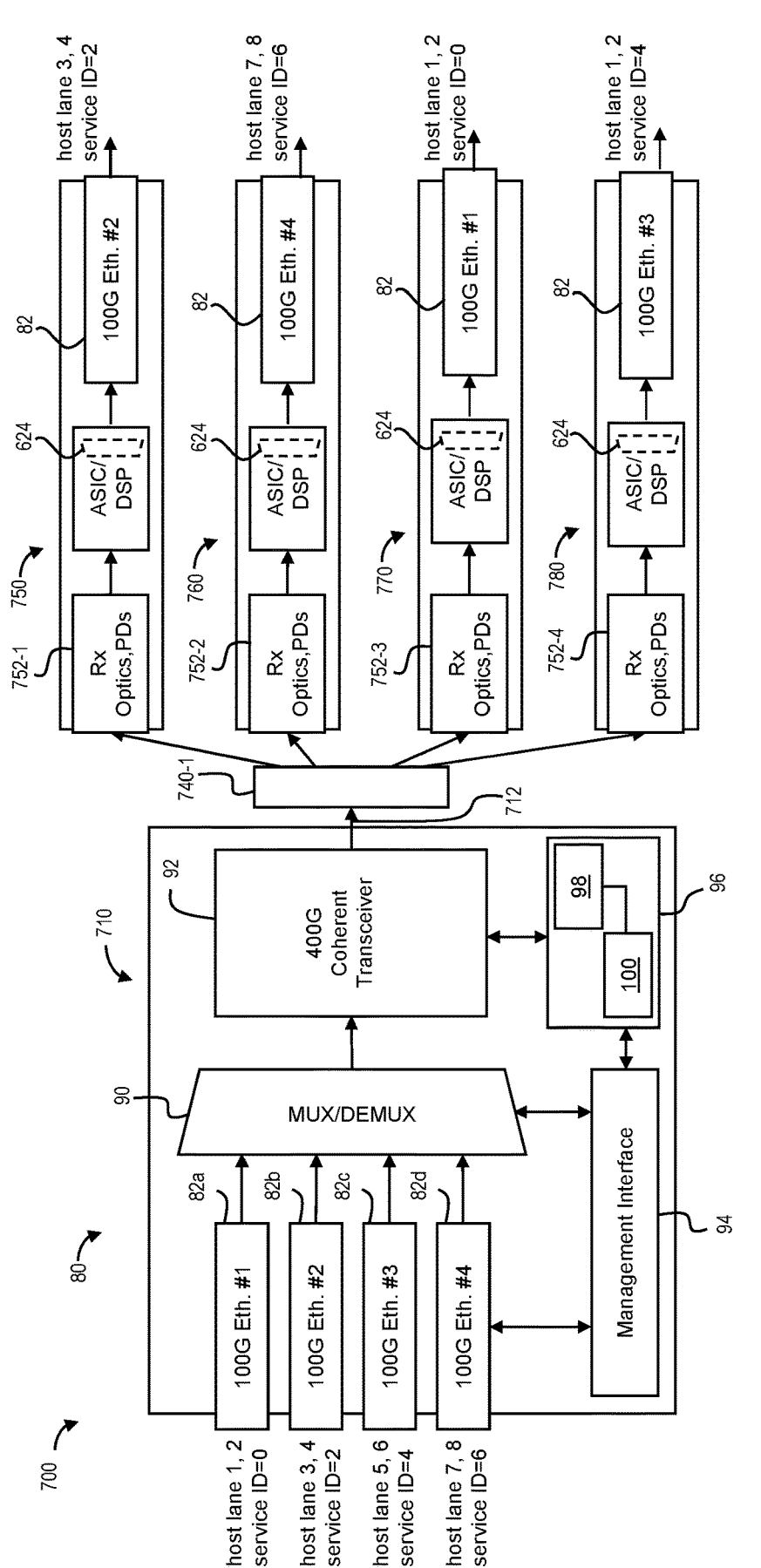
Figures 2, 7A:
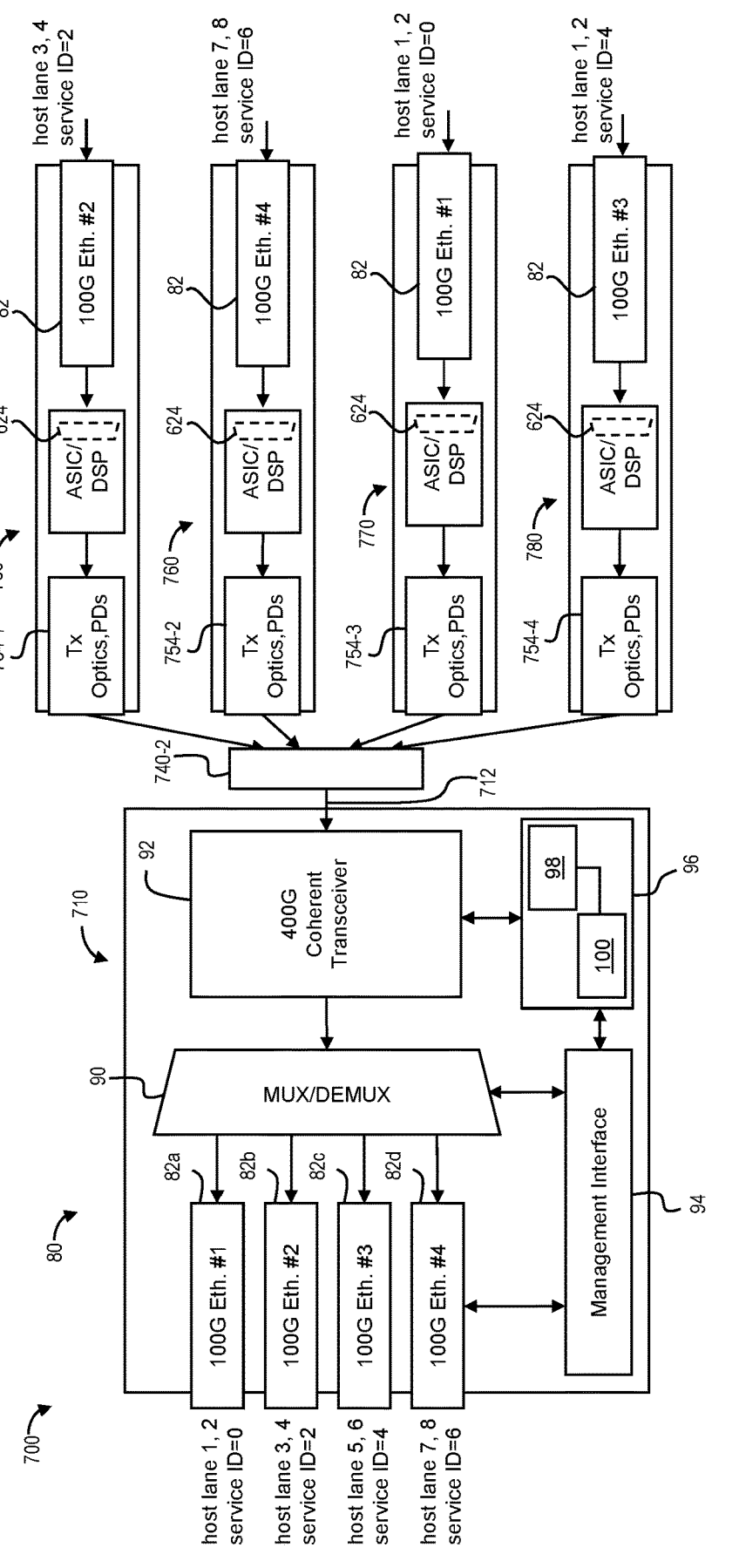

FIG. 5 illustrates an implementation of a transport network 500 implementing CMIS on a multi-point capable network element 14a-1. The multi-point capable network element 14a-1 may be or may have a multi-point capable muxponder 510. The multi-point capable muxponder 510 is similar to the muxponder 80, therefore, only the differences will be described in detail herein. In the multi-point capable muxponder 510, each electrical port, such as the first through fourth electrical ports 82a-82d is mapped to a different corresponding laser (e.g., a first laser 530, a second laser 532, a third laser 534, and a fourth laser 536) that outputs a signal onto a pair of fiber cables, A pair of fiber cables may be referred to as a media lane and may be assigned a register number. For example, the illustrated transport network 500 has four media lanes which may be assigned register numbers, such as media lane 1, media lane 2, media lane 3, and media lane 4. The fiber pairs can be physically routed to corresponding different routers or hosts, such as a second network element 14b, a third network element 14c, a fourth network element 14d, and a fifth network element 14e. The second network element 14b, third network element 14c, fourth network element 14d, and fifth network element 14e, are simplified in FIG. 5 for ease of illustration, but may be similar in construction and/or function to the muxponder 80.

For instance, data originating from host lane 1 (the first electrical register 84a) and host lane 2 (the second electrical register 84b) together comprising the first host service ID 88a on the sending module 14a are mapped to the first laser 530 transmitting over media lane 1 to the second network element 14b. Likewise, data originating from the second host service ID 88b is mapped to the second laser 532 transmitting over media lane 2 to the third network element 14c, data originating from the third host service ID 88c is mapped to the third laser 534 transmitting over media lane 3 to the fourth network element 14d, and data originating from the fourth host service ID 88d is mapped to the fourth laser 536 transmitting over media lane 4 to the fifth network element 14e. While the multi-point capable muxponder 500 has the capability to route signals to physically different routers or hosts using the mapped lasers 530-536 and media lanes 1-4, the mapping is fixed and cannot be changed.

The presently disclosed inventive concepts solve the problem of fixed mapping in the prior art by enabling dynamic host lane mapping which allows a network operator to dynamically map host lanes in a host lane group on a first network element to a desired host lane group on a second network element. In one such implementation illustrated in FIG. 6, a transport network 600 is provided with a first network element 610 connected to a second network element 620 via a media lane 630. For the purposes of illustration and clarity, the first network element 610 will be referred to as an anchor module 610 and/or as an anchor muxponder module 610, and the second network element 620 will be referred to as a configured module 620 and/or as a configured muxponder module 620. The transport network 600 represents an implementation of a network carrying a point-to-point application.

The anchor module 610 and the configured module 620 are similar to the network element 14 described above. Therefore, for the sake of brevity, like elements will be numbered the same and only the differences will be described in further detail. For purposes of illustration, in FIG. 6, the processor 98 and the mux memory 100 in the anchor module 610 and the configured module 620 are labeled as an anchor-module-processor 98a, a configured-module-processor 98b, an anchor-module-mux-memory 100a, and a configured-module-mux-memory 100b.

In the illustrated implementation, the anchor module 610 is provided with a muxponder 80a that is hardwired and/or programed to operate using the CMIS standard described above. For instance, as represented in anchor module mapping table 612, host lanes 1 and 2 are a first host lane group which may support a first application instance and are mapped to the first host service ID 88a, host lanes 3 and 4 are a host lane group which may support a second application instance and are mapped to the second host service ID 88b, host lanes 5 and 6 are a host lane group which may support a third application instance and are mapped to the third host service ID 88c, and host lanes 7 and 8 are a host lane group which may support a fourth application instance and are mapped to the fourth host service ID 88d. The host lanes 1-8 may be serialization/deserialization (SERDES) lanes, for instance, that are driven by synchronous optical network (SONET) standards and Optical Interface Forum (OIF) standards. The anchor module 610 utilizes the service IDs, such as the first through fourth host service IDs 88a-88d, on outbound traffic streams to allow the outbound traffic stream to be mapped at a receiving module such as the configured module 620.

In the illustrated implementation, the configured module 620 may be provided with a muxponder 622 having a multiplexer/demultiplexer 624 with built-in digital cross-connect capability, a dynamic management interface 626 electrically connected to a controller 96a and the multiplexer/demultiplexer 624, and a configured module mapping table 628 that may be stored in a mux memory 100b.

A processor 98b of the configured module 620 may be configured to access the configured module mapping table 628 to assign traffic streams to the host lanes (such as the first through fourth electrical registers 84a1-84d1 and 86a1-86d1) of the electrical ports 82a1-82d1 based on first through fourth host service IDs 88a-88d mapped from the anchor module 610. A controller 96b of the configured module 620 may be provided with logic stored in the mux memory 100b that, when executed, is configured to cause the processor 98b to send a signal or signals to the multiplexer/demultiplexer 624 causing the digital cross-connect of the multiplexer/demultiplexer 624 to dynamically route incoming and outgoing traffic streams according to the configured module mapping table 628.

For instance, in the illustrated implementation, a first traffic stream received at the first host lane 84a and a second traffic stream received at the second host lane 86a are assigned a first host service ID 88a (assigned a service-ID number of 0) and the logic causes the processor 98b of the configured module 620 to route the first traffic stream and the second traffic stream to the third electrical port 82c1 and host lane 5 (84c1) and host lane 6 (86c1) based on the first host service ID 88a (service-ID number 0) stored in the configured module mapping table 628. Similarly, a third traffic stream received at the third host lane 84b and a fourth traffic stream received at the fourth host lane 86b are assigned a second host service ID 88b (assigned a service-ID number of 2) and the logic causes the processor 98b of the configured module 620 to route the third traffic stream and the fourth traffic stream to the first electrical port 82a1 and host lane 1 (84a1) and host lane 2 (86a1) based on the second host service ID 88b (service-ID number 2) stored in the configured module mapping table 628; a fifth traffic stream received at the fifth host lane 84c and a sixth traffic stream received at the sixth host lane 86c are assigned a third host service ID 88c (assigned a service-ID number of 4) and the logic causes the processor 98b of the configured module 620 to route the fifth traffic stream and the sixth traffic stream to the fourth electrical port 82d1 and host lane 7 (84d1) and host lane 8 (86d1) based on the service ID 88c (service-ID number 4) stored in the configured module mapping table 628; and a seventh traffic stream received at the seventh host lane 84d and an eighth traffic stream received at the eighth host lane 86d are assigned a fourth host service ID 88d (assigned a service-ID number of 6) and the logic causes the processor 98b to route the seventh traffic stream and the eighth traffic stream to the second electrical port 82b1 and host lane 3 (84b1) and host lane 4 (86b1) based on the fourth host service ID 88d (service-ID number 6) stored in the configured module mapping table 628.

In the illustrated implementation, the first traffic stream, second traffic stream, third traffic stream, fourth traffic stream, fifth traffic stream, sixth traffic stream, seventh traffic stream, and eighth traffic stream are multiplexed in a multiplexer/demultiplexer 90a of the anchor module 610 and converted into a combined optical data stream by an optical transceiver 92a of the anchor module 610 before being transmitted via the media lane 630, which may be a fiber optic link.

The combined optical data stream may be received by the optical transceiver 92b of the configured module 620, which may convert the incoming combined optical signal to electrical signals equivalent to the first traffic stream, second traffic stream, third traffic stream, fourth traffic stream, fifth traffic stream, sixth traffic stream, seventh traffic stream, eighth traffic stream, which may be demultiplexed by the multiplexer/demultiplexer 90b of the configured module 620 and routed by the digital cross-connect of the multiplexer/demultiplexer 90b to the electrical ports 82a1-82d1 based on the first through fourth host service IDs 88a-88d mapped from the anchor module 610 as described above.

Likewise, traffic streams travelling from the configured module 620 to the anchor module 610 uses the same mapping between host lanes and service IDs to direct traffic streams to the mapped host lanes on the anchor module 610.

While the illustrated implementation is shown having four host lane groups each having a supported application instance and an associated service ID 88, it should be noted that in some implementations, each host lane 1-8 may support an application instance and have an associated service ID (e.g., service ID 1-8). In either implementation, a first host lane number of a host lane group supporting an application instance (e.g., "1" of the host lane 1 supporting the first application instance) may be used to assign the service ID 88 (which may be the same as assigning a DataPathID in Staged Configuration Set) which defines the associated service by DataPath Configuration. Host lanes within a host lane group supporting a given application share the same service ID 88. Note that in some implementations, in accordance with the CMIS standard, the service-ID number of the first service ID 88 may begin with 0 (000b). Thus, a host lane group including host lane 1 and host lane 2 supporting a first application instance may share the service ID 88 identified as service-ID number 0. In such an implementation having eight host lanes, a second host lane group including host lane 3 and host lane 4 may share the service ID 88 identified as service-ID number 2, a third host lane group including host lane 5 and host lane 6 may share the service ID 88 identified as service-ID number 4, and a fourth host lane group including host lane 7 and host lane 8 may share the service ID 88 identified as service-ID number 6.

In some implementations, coordination of the service IDs 88 between the anchor module 610 and the configured module 620 may be handled by a management interface 94a of the anchor module 610 and the dynamic management interface 626 of the configured module 620. In some implementations, coordination of the service IDs between the anchor module 610 and the configured module 620 may be handled by the controller 96a of the anchor module 610 and the controller 96b of the configured module 620. In some implementations, coordination of the service IDs 88 between the anchor module 610 and the configured module 620 may be handled by the computer system 30 connected to the anchor module 610 and the configured module 620 via a control plane or a management plane.

In implementations of the presently disclosed concepts, both ends of the media lane 630 (i.e., the anchor module 610 and the configured module 620) may be able to reconfigure mapping between host lanes and service IDs 88. However, only one end needs to be able to reconfigure mapping between host lanes and service IDs 88 to implement the desired mapping. In other words, in some implementations, the anchor module 610 may be a legacy module that follows default CMIS fixed mapping where the service ID 88 is the same as DataPathID in Active Control Set and the configured module 620 may be configured to dynamically map the host lanes and service IDs 88 from the legacy module to desired host lanes on the configured module 620 by assigning values in the configured module mapping table 628 and direct the traffic streams using the built-in cross-connect of the multiplexer/demultiplexer 90b as directed by the configured module mapping table 628.

In some implementations, a module such as the anchor module 610 may be capable of reconfiguring mapping between host lanes and service IDs 88. However, the network operator may choose to operate the anchor module 610 following the default CMIS mapping, for example, if the anchor module 610 is originally configured in accordance with the CMIS standard. In such an implementation, a "set as anchored" option may be programmed to assign an anchored role to the anchor module 610. The "set as anchored" option may be programmed to copy an Active Control Set DataPathID (in accordance with the CMIS standard) automatically to a mapping table such as the anchor module mapping table 612 and make the anchor module mapping table 612 read-only for the anchor module 610.

Referring now to FIGS. 7A-1, 7A-2, and 7B, shown therein is an exemplary implementation of a transport network 700. The transport network 700 represents an implementation of a network carrying a point-to-multi-point application with service selecting and lane mapping. The transport network 700 allows point to multi-point networking without requiring a laser for each media lane as required in the prior art (see FIG. 5, for example). The transport network 700 may be provided with an anchor module 710, an optical splitter 740-1 (FIG. 7A-1) that splits optical transmissions traveling from the anchor module 710 to a first configured module 750, a second configured module 760, a third configured module 770, and a fourth configured module 780, and an optical combiner 740-2 (FIG. 7A-2) that combines optical signals traveling from the first configured module 750, the second configured module 760, the third configured module 770, and the fourth configured module 780 to the anchor module 710. In the illustrated implementation, each of the first configured module 750, second configured module 760, third configured module 770, and fourth configured module 780 are provided with a receive optical port 752 (752-1-752-4) and a transmission optical port 754 (754-1-754-2).

It will be understood that four configured modules 750-780 are shown for exemplary purposes, but that the transport network 700 may have more or fewer configured modules. The anchor module 710 is similar to network element 14 described above. Therefore, for the sake of brevity, like elements will be numbered the same and only the differences will be described in further detail. The first configured module 750, second configured module 760, third configured module 770, and fourth configured module 780 are simplified in FIG. 7A for ease of illustration but may be similar in construction and/or function to muxponder 80. Further, for the sake of illustration the lines representing the host lanes have been omitted and are represented as text.

In the illustrated implementation, traffic streams 1-8 coming in on host lanes 1-8 are assigned service-ID numbers 0, 2, 4, and 6 as described above, combined in the multiplexer/demultiplexer 90, and converted to a combined optical signal in the optical transceiver 92 before being transmitted on a first media lane 712. The combined optical signal (which may be referred to as a downstream combined optical signal) is split by the optical splitter 740-1 into a split optical signal and the split optical signal is transmitted on a second media lane 714 to the receive optical port 752-1 of the first configured module 750, a third media lane 716 to the receive optical port 752-2 of the second configured module 760, a fourth media lane 718 to the receive optical port 752-3 of the third configured module 770, and a fifth media lane 720 to the receive optical port 752-4 of the fourth configured module 780.

Each of the receive optical ports 752 may be include a local oscillator laser, optical hybrids, and photodiodes that operate in a known manner to provide electrical signals to an ADC (which may be included in the ASIC), which, in turn, provides digital signals or samples to the DSP.

The split optical signal received by each of the first configured module 750, second configured module 760, third configured module 770, and fourth configured module 780 comprises all of the traffic streams 1-8 of the combined optical signal. The first configured module 750, second configured module 760, third configured module 770, and fourth configured module 780 each have a configured module mapping table (configured module mapping table 792, configured module mapping table 794, configured module mapping table 796, and configured module mapping table 798, respectively) that is used by the digital cross-connect of the multiplexer/demultiplexer 90 to select the traffic streams intended for the respective configured module and send the selected traffic streams to the desired host lanes.

For example, in the illustrated implementation traffic streams 1 and 2 are received on host lanes 1 and 2, respectively, and assigned service-ID number 0. Traffic streams 1 and 2 are mapped to the third configured module 770. When the split optical signal is received by the third configured module 770, the split optical signal is converted to a split electrical signal and passed to a multiplexer/demultiplexer 624 having a built-in digital cross-connect. The digital cross-connect of the multiplexer/demultiplexer 624 demultiplexer the split electrical signal and passes traffic streams 1 and 2 through the electrical connection 82 to host lanes 1 and 2 of the third configured module 770. The remaining traffic streams 3-8 are not used by the third configured module 770 and are discarded by the third configured module 770. Similar processes are carried out in each of the first configured module 750 to extract traffic streams 3 and 4, the second configured module 760 to extract traffic streams 7 and 8, and the fourth configured module 780 to extract traffic streams 1 and 2.

In the illustrated implementation, traffic streams may be received on host lanes 3 and 4 of the first configured module 750, host lanes 7 and 8 of the second configured module 760, host lanes 1 and 2 of the third configured module 770, and host lanes 1 and 2 of the fourth configured module 780, and may be assigned service-ID numbers 2, 6, 0, and 4, respectively, as described above. The first configured module 750, second configured module 760, third configured module 770, and fourth configured module 780 may use the configured mapping tables 790-792 to map the traffic streams to the anchor module 710 through the transmission optical ports 754. Each of the transmission optical ports 754 may be provided with modulators, modulator driver circuitry, and lasers that transmit an optical signal on each of the second media lane 714, third media lane 716, fourth medial lane 718, and fifth media lane 720 which may be combined into a combined optical signal (which may be referred to as an upstream combined optical signal) at the combiner 740-2 before being transmitted to the anchor module 710.

While the first configured module 750, second configured module 760, third configured module 770, and fourth configured module 780 have been illustrated having the receive optical ports 752 and the transmission optical ports 754, in some implementations, the first configured module 750, the second configured module 760, the third configured module 770, and the fourth configured module 780, may be provided with optical transceivers, such as the optical transceiver 92 described above, that perform transmission and receiving functions of optical signals.

Figure 8:
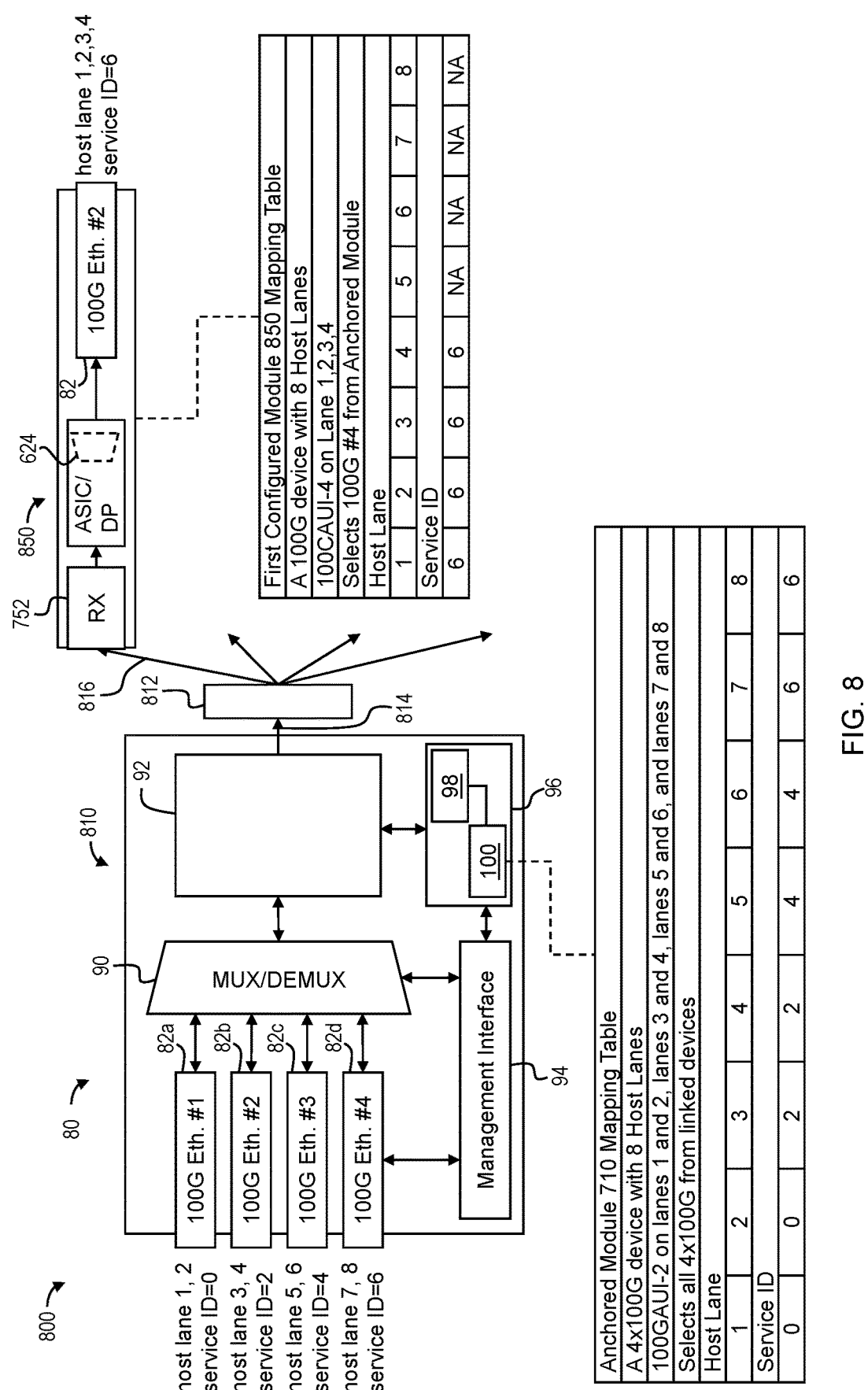
FIG. 8 is a diagram of an exemplary implementation of a transport network with host lanes of different modules having different lane rates constructed in accordance with the present disclosure.

Referring now to FIG. 8, shown therein is an exemplary implementation of another transport network 800. The transport network 800 represents an implementation of a point-to-multi-point network having modules with different lane rates. The transport network 800 may be provided with an anchor module 810, an optical splitter/combiner 812, a first media lane 814, a second media lane 816, and a first configured module 850. It should be noted that the transport network 800 may be provided with a second configured module, a third configured module, and a fourth configured module that are not shown for simplicity. It will be understood that the transport network 800 may have more or fewer configured modules. The anchor module 810 is similar to network element 14 described above. Therefore, for the sake of brevity, like elements will be numbered the same and only the differences will be described in further detail. The first configured module 850 is simplified in FIG. 8 for ease of illustration but may be similar in construction and/or function to the muxponder 80 as shown in FIG. 3 and/or the first configured module 750 as shown in FIGS. 7A-1, 7A-2, and 7B. Further, for the sake of illustration the lines representing the host lanes have been omitted and are represented as text.

In the illustrated implementation, the anchor module 810 and the first configured module 850 have different host lane rates. Specifically, the anchor module 810 is illustrated as a 4×100 gigabit device with eight host lanes each having a 50 gigabit rate. The first configured module 850 is illustrated as a 100 gigabit device with four host lanes each having a 25 gigabit rate. As illustrated in FIG. 8, traffic streams such as traffic streams 7 and 8 may be mapped from host lanes 7 and 8 (each having a 50 gigabit rate) of the anchor module 810 to host lanes 1-4 (each having a 25 gigabit rate) of the first configured module 850, so long as a combined rate of host lanes grouped on the anchor module 810 (e.g., host lanes 7 and 8) and a combined rate of host lanes grouped on the configured module 850 (e.g., host lanes 1-4) are equal.

The transport network 800 is illustrated transmitting signals in one direction (which may be referred to as a "downstream" direction). However, it should be noted that the transport network 800 may transmit signals in an opposite direction (which may be referred to as an "upstream" direction) with the first configured module 850 having similar hardware and functionality as the first configured module 750 described with respect to FIGS. 7A-1, 7A-2, and 7B.

Figure 9:
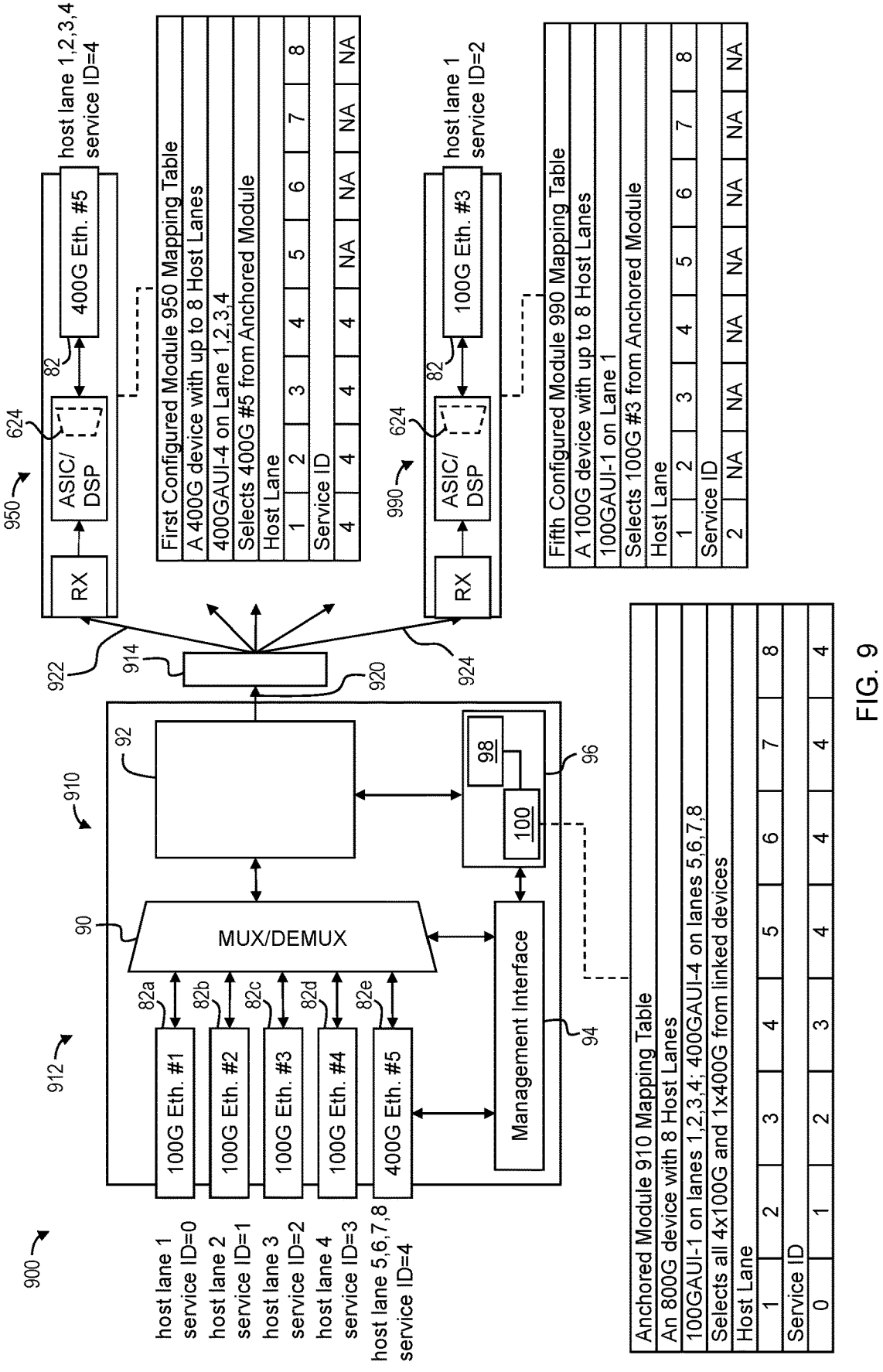
FIG. 9 is a block diagram of an exemplary implementation of a point to multi-point transport network having modules with mixed capacities constructed in accordance with the present disclosure.

Referring now to FIG. 9, shown therein is an exemplary implementation of another transport network 900. The transport network 900 represents an implementation of a point-to-multi-point network having modules with mixed capacities. The transport network 900 may be provided with an anchor module 910, having a muxponder 912, an optical splitter/combiner 914, a first media lane 920, a second media lane 922, a third media lane 924, a first configured module 950, and a fifth configured module 990. It should be noted that the transport network 900 may be provided with a second configured module, a third configured module, and a fourth configured module that are not shown for simplicity. It will be understood that the transport network 900 may have more or fewer configured modules. The anchor module 910 is similar to network element 14 described above. Therefore, for the sake of brevity, like elements will be numbered the same and only the differences will be described in further detail. The first configured module 950 and the fifth configured module 990 are simplified in FIG. 9 for ease of illustration, but may be similar in construction and/or function to the muxponder 80 as shown in FIG. 3. Further, for the sake of illustration the lines representing the host lanes have been omitted and are represented as text.

The anchor module 910 is provided with a muxponder 912 having a first, second, third, fourth, and fifth electrical ports 82a-82e having associated host lanes 1-8. The first, second, third, and fourth electrical ports 82a-82d have, for example, a 100 gigabit capacity and the fifth electrical port 82e has a 400 gigabit capacity, for example. Each of the host lanes 1-8 has a 100 gigabit rate, for example. Host lanes 5-8 have a combined 400 gigabit capacity and are associated with the fifth electrical port 82f to equal the 400 gigabit capacity of the fifth electrical port 82f.

The first configured module 950 is a 400 gigabit device. In the illustrated implementation, the first configured module 950 is a module configured using 400GAUI-4 on host lanes 1-4. It should be noted that the first configured module 950 may be any form factor that supports 400GAU1-4.

The fifth configured module 990 is a 100 gigabit device supporting 100GAUI-1 on lane 1. It should be noted that the fifth configured module 990 could be any form factor that supports 100GAU1-1.

In networks having modules with mixed capacities, such as transport network 900, host lanes may be mapped to appropriately sized modules having the same or greater capacity. For example, host lanes 5-8 having a combined capacity of 400 gigabit may be mapped to the first configured module 950 having a 400 gigabit capacity. In the illustrated example, host lanes 5-8 of the anchor module 910 each having a 100 gigabit capacity are mapped to host lanes 1-4 of the first configured module 950 each also having a 100 gigabit capacity. However, it should be noted that host lanes 5-8 having a combined capacity of 400 gigabits may be mapped to a module such as configured module 620 described above with respect to FIG. 6 having eight host lanes each having a 50 gigabit capacity for a combined capacity of 400 gigabits. In the illustrated implementation, host lane 3 having a capacity of 100 gigabit is mapped to host lane 1 of the fifth configured module 990 which also has a capacity of 100 gigabit.

The illustrated transport network 900 is a point-to-multi-point network that operates similarly to the transport network 700 described above. In the anchor module 910, multiple traffic streams are combined into a combined optical signal that is transmitted on the first media lane 920 to the optical splitter/combiner 914 that splits the combined optical signal into a split optical signal that is transmitted to the first configured module 950 over the second media lane 922 and the fifth configured module 990 over the third media lane 924. In accordance with a mapping table of the first configured module 950, the first configured module 950 selects traffic streams having an associated service-ID number 6 originating from host lanes 5-8 of the anchor module 910, passes the selected traffic streams to host lanes 1-4, and discards the rest. The fifth configured module 990 selects the traffic stream associated with service-ID number 2 originating from host lane 3, passes the selected traffic stream to host lane 1, and discards the rest of the traffic streams.

The transport network 900 is illustrated transmitting signals in one direction (which may be referred to as a "downstream" direction). However, it should be noted that the transport network 900 may transmit signals in an opposite direction (which may be referred to as an "upstream" direction) with the first configured module 950 and the fifth configured module 990 having similar hardware and functionality as the first configured module 750 described with respect to FIGS. 7A-1, 7A-2, and 7B.

From the above description, it is clear that the inventive concept(s) disclosed herein are well adapted to carry out the objects and to attain the advantages mentioned herein, as well as those inherent in the inventive concept(s) disclosed herein. While the implementations of the inventive concept(s) disclosed herein have been described for purposes of this disclosure, it will be understood that numerous changes may be made and readily suggested to those skilled in the art which are accomplished within the scope and spirit of the inventive concept(s) disclosed herein.

What is claimed is:

1. An optical transport network system, comprising:
an anchor muxponder module, comprising:
    a first electrical port having a first host lane receiving a first traffic stream and a second host lane receiving a second traffic stream, the first host lane having a first electrical register, and the second host lane having a second electrical register;
    a second electrical port having a third host lane receiving a third traffic stream and a fourth host lane receiving a fourth traffic stream, the third host lane having a third electrical register and the fourth host lane having a fourth electrical register;

wherein the first electrical register of the first host lane and the second electrical register of the second host lane are associated with a first service identification code, and the third electrical register of the third host lane and the fourth electrical register of the fourth host lane are associated with a second service identification code; and at least one optical transmitter configured to transmit the first traffic stream, the second traffic stream, the third traffic stream, and the fourth traffic stream;

at least one configured muxponder module comprising:

at least one optical receiver configured to receive the first traffic stream, the second traffic stream, the third traffic stream, and the fourth traffic stream;

a first configured electrical port having a first configured host lane associated with a first configured electrical register and a second configured host lane associated with a second configured electrical register;

a second configured electrical port having a third configured host lane associated with a third configured electrical register and a fourth configured host lane associated with a fourth configured electrical register;

a dynamically configurable digital cross-connect; and a configured processor accessing a dynamically configurable mapping table to assign traffic streams associated with the first service identification code to the first configured host lane and the second configured host lane of the first configured electrical port, traffic streams associated with the second service identification code to the third configured host lane and the fourth configured host lane of the second configured electrical port, and having logic to control the dynamically configurable digital cross-connect to route the first traffic stream and the second traffic stream to the first configured electrical port based on the first service identification code, and the third traffic stream and the fourth traffic stream to the second configured electrical port based on the second service identification code; and one or more fiber optic links connecting the least one optical transmitter of the anchor module to the at least one optical receiver of the configured module, wherein said one or more fiber optic links are configured to transmit the first traffic stream, the second traffic stream, the third traffic stream, and the fourth traffic stream.

2. The system of claim 1, wherein the anchor muxponder module further comprises:

a third electrical port having a fifth host lane receiving a fifth traffic stream and a sixth host lane receiving a sixth traffic stream, the fifth host lane having a fifth electrical register, and the sixth host lane having a second electrical register, wherein the fifth electrical register of the fifth host lane and the sixth electrical register of the sixth host lane are associated with a third service identification code; and a fourth electrical port having a seventh host lane receiving a seventh traffic stream and an eighth host lane receiving an eighth traffic stream, the seventh host lane having a seventh electrical register and the eighth host lane having an eighth electrical register, wherein the seventh electrical register of the seventh host lane and the eighth electrical register of the eighth host lane are associated with a fourth service identification code; and wherein the at least one configured muxponder module further comprises:

a third configured electrical port having a fifth configured host lane associated with a fifth configured electrical register and a sixth configured host lane associated with a sixth configured electrical register;

a fourth configured electrical port having a seventh configured host lane associated with a seventh configured electrical register and an eighth configured host lane associated with an eighth configured electrical register; and wherein the configured processor accessing the dynamically configurable mapping table assigns traffic streams associated with the third service identification code to the fifth configured host lane and the sixth configured host lane of the third electrical port, and traffic associated with the fourth service identification code to the seventh configured host land and the eight configured host lane associated with the fourth electrical port, and the logic to controlling the dynamically configurable digital cross-connect routes the fifth traffic stream and the sixth traffic stream to the third configured electrical port based on the third service identification code, and the seventh traffic stream and the eight traffic stream to the fourth configured electrical port based on the fourth service identification code.

3. The system of claim 1, wherein the at least one optical receiver comprises a first optical receiver and a second optical receiver, and wherein the at least one configured muxponder module comprises:

a first configured muxponder module comprising the first optical receiver, a first dynamically configurable digital cross-connect, and the first electrical port, the first optical receiver receiving the first traffic stream and the second traffic stream; and a second configured muxponder module comprising the second configured optical receiver, a second dynamically configurable digital cross-connect, and the second configured electrical port, the second configured optical receiver receiving the third traffic stream and the fourth traffic stream.

4. The system of claim 3, wherein the anchor muxponder module further comprises a multiplexer, the multiplexer configured to combine the first traffic stream, the second traffic stream, the third traffic stream, and the fourth traffic as a combined traffic stream and pass the combined traffic stream to the at least one optical transmitter, the at least one optical transmitter configured to convert the combined traffic stream to at least one combined optical signal and provide the at least one combined optical signal to the one or more fiber optic links.

5. The system of claim 4, further comprising an optical splitter connected to the one or more fiber optic links, the optical splitter configured to receive the at least one combined optical signal from the at least one optical transmitter and split the at least one combined optical signal to form at least one split optical signal.

6. The system of claim 5, wherein the first configured muxponder module further comprises a first demultiplexer, the second configured muxponder module further comprises a second demultiplexer, and the at least one split optical signal comprises a first split optical signal directed to the first configured muxponder module and a second split optical signal directed to the second configured muxponder module, each of the first split optical signal and the second split optical signal comprising the first traffic stream, the second traffic stream, the third traffic stream, and the fourth traffic stream;

wherein the first configured muxponder module is configured to receive, at the first optical receiver, the first split optical signal, demultiplex, with the first demultiplexer the first split optical signal into the first traffic stream, the second traffic stream, the third traffic stream, and the fourth traffic stream, and route, with the first dynamically configurable digital cross connect accessing a first dynamically configurable mapping table, the first traffic stream and the second traffic stream to the first configured electrical port; and wherein the second configured muxponder module is configured to receive, at the second optical receiver, the second split optical signal, demultiplex, with the second demultiplexer the second split optical signal into the first traffic stream, the second traffic stream, the third traffic stream, and the fourth traffic stream, and route, with the second dynamically configurable digital cross connect accessing a second dynamically configurable mapping table, the third traffic stream and the fourth traffic stream to the second configured electrical port.

7. An optical transport network system, comprising:

a configured muxponder module, comprising:

an optical receiver configured to receive a combined optical signal comprising a first traffic stream, a second traffic stream, a third traffic stream, and a fourth traffic stream;

a first configured electrical port having a first configured host lane associated with a first configured electrical register and a second configured host lane associated with a second configured electrical register;

a second configured electrical port having a third configured host lane associated with a third configured electrical register and a fourth configured host lane associated with a fourth configured electrical register;

a demultiplexer having a built-in dynamically configurable digital cross-connect configured to demultiplex the combined optical signal into the first traffic stream, the second traffic stream, the third traffic stream, and the fourth traffic stream; and a configured processor accessing a dynamically configurable mapping table to assign traffic streams associated with a first service identification code to the first configured host lane and the second configured host lane of the first configured electrical port, traffic streams associated with a second service identification code to the third configured host lane and the fourth configured host lane of the second configured electrical port, and having logic to control the dynamically configurable digital cross-connect to route the first traffic stream and the second traffic stream to the first configured electrical port based on the first service identification code, and the third traffic stream and the fourth traffic stream to the second configured electrical port based on the second service identification code.

8. The system of claim 7, further comprising an anchor muxponder module, comprising:

a first electrical port having a first host lane receiving the first traffic stream and a second host lane receiving the second traffic stream, the first host lane having a first electrical register, and the second host lane having a second electrical register;

a second electrical port having a third host lane receiving the third traffic stream and a fourth host lane receiving the fourth traffic stream, the third host lane having a third electrical register and the fourth host lane having a fourth electrical register;

wherein the first electrical register of the first host lane and the second electrical register of the second host lane are associated with the first service identification code, and the third electrical register of the third host lane and the fourth electrical register of the fourth host lane are associated with the second service identification code; and at least one optical transmitter configured to transmit the first traffic stream, the second traffic stream, the third traffic stream, and the fourth traffic stream as the combined optical signal.

9. The system of claim 8, wherein the anchor muxponder module further comprises a multiplexer, the multiplexer configured to combine the first traffic stream, the second traffic stream, the third traffic stream, and the fourth traffic into a combined traffic stream and pass the combined traffic stream to the at least one optical transmitter, the at least one optical transmitter configured to convert the combined traffic stream to the combined optical signal and provide the combined optical signal to a one or more fiber optic links.

10. The system of claim 9, further comprising an optical splitter connected to the one or more fiber optic links, the optical splitter configured to receive the combined optical signal from the at least one optical transmitter and split the combined optical signal to form at least one split optical signal.

11. The system of claim 8, wherein the anchor muxponder module further comprises:

a third electrical port having a fifth host lane receiving a fifth traffic stream and a sixth host lane receiving a sixth traffic stream, the fifth host lane having a fifth electrical register, and the sixth host lane having a second electrical register, wherein the fifth electrical register of the fifth host lane and the sixth electrical register of the sixth host lane are associated with a third service identification code;

a fourth electrical port having a seventh host lane receiving a seventh traffic stream and an eighth host lane receiving an eighth traffic stream, the seventh host lane having a seventh electrical register and the eighth host lane having an eighth electrical register; wherein the seventh electrical register of the seventh host lane and the eighth electrical register of the eighth host lane are associated with a fourth service identification code; and wherein the configured muxponder module further comprises:

a third configured electrical port having a fifth configured host lane associated with a fifth configured electrical register and a sixth configured host lane associated with a sixth configured electrical register;

a fourth configured electrical port having a seventh configured host lane associated with a seventh configured electrical register and an eighth configured host lane associated with an eighth configured electrical register; and wherein the configured processor accessing the dynamically configurable mapping table assigns traffic streams associated with the third service identification code to the fifth configured host lane and the sixth configured host lane of the third electrical port, and traffic associated with the fourth service identification code to the seventh configured host land and the eight configured host lane associated with the fourth electrical port, and the logic to controlling the dynamically configurable digital cross-connect routes the fifth traffic stream and the sixth traffic stream to the third configured electrical port based on the third service identification code, and the seventh traffic stream and the eight traffic stream to the fourth configured electrical port based on the fourth service identification code.

12. The system of claim 11, wherein the anchor muxponder module further comprises a multiplexer, the multiplexer configured to combine the first traffic stream, the second traffic stream, the third traffic stream, the fourth traffic stream, the fifth traffic stream, the sixth traffic stream, the seventh traffic stream, and the eighth traffic stream into a combined traffic stream and pass the combined traffic stream to the at least one optical transmitter, the at least one optical transmitter configured to convert the combined traffic stream to the combined optical signal and provide the combined optical signal to one or more fiber optic links.

13. The system of claim 12, further comprising an optical splitter connected to the one or more fiber optic links, the optical splitter configured to receive the combined optical signal from the at least one optical transmitter and split the combined optical signal to form at least one split optical signal, each at least one split optical signal comprising the first traffic stream, the second traffic stream, the third traffic stream, the fourth traffic stream, the fifth traffic stream, the sixth traffic stream, the seventh traffic stream, and the eighth traffic stream.

14. The system of claim 13, wherein the configured muxponder module is a first configured muxponder module and the system further comprises a second configured muxponder module, and wherein the at least one split optical signal comprises a first split optical signal directed to the first configured muxponder module and a second split optical signal directed to the second configured muxponder module.

15. The optical transport network system of claim 7, wherein:
the configured muxponder module is a first configured muxponder module;
the optical receiver is a first optical receiver of the first configured muxponder module;
the demultiplexer is a first demultiplexer of the first configured muxponder module;
the optical transport network system further comprises a second optical receiver and a second demultiplexer;
the combined optical signal comprises a first split optical signal directed to the first configured muxponder module and a second split optical signal directed to the second configured muxponder module, each of the first split optical signal and the second split optical signal comprising the first traffic stream, the second traffic stream, the third traffic stream, and the fourth traffic stream;
wherein the first configured muxponder module is configured to receive, at the first optical receiver, the first split optical signal, demultiplex, with the first demultiplexer the first split optical signal into the first traffic stream, the second traffic stream, the third traffic stream, and the fourth traffic stream, and route, with the first dynamically configurable digital cross connect accessing a first dynamically configurable mapping table, the first traffic stream and the second traffic stream to the first configured electrical port; and
wherein the second configured muxponder module is configured to receive, at the second optical receiver, the second split optical signal, demultiplex, with the second demultiplexer the second split optical signal into the first traffic stream, the second traffic stream, the third traffic stream, and the fourth traffic stream, and route, with the second dynamically configurable digital cross connect accessing a second dynamically configurable mapping table, the third traffic stream and the fourth traffic stream to the second configured electrical port.

16. A method, comprising:
receiving, with an optical receiver of a muxponder, a combined optical data stream including a first traffic stream, a second traffic stream, a third traffic stream, and a fourth traffic stream, the first traffic stream and the second traffic stream associated with a first service identification code, the third traffic stream and the fourth traffic stream associated with a second service identification code; and
controlling, by a processor of the muxponder, a dynamically configurable digital cross-connect to route the first traffic stream to a first electrical register and the second traffic stream to a second electrical register based on the first service identification code, and the third traffic stream to a third electrical register and the fourth traffic stream to a fourth electrical register based on the second service identification code.

17. The method of claim 16, wherein first traffic stream, the second traffic stream, the third traffic stream, and the fourth traffic stream are transmitted from an optical transmitter of an anchor muxponder module.

18. The method of claim 16, wherein the processor of the muxponder accesses a dynamically configurable mapping table to determine how to route the first traffic stream to the first electrical register and the second traffic stream to the second electrical register based on the first service identification code, and the third traffic stream to the third electrical register and the fourth traffic stream to the fourth electrical register based on the second service identification code.

19. The method of claim 16, wherein after receiving the combined optical data stream, the combined optical data stream is demultiplexed into the first traffic stream, the second traffic stream, the third traffic stream, and the fourth traffic stream.

20. The method of claim 17, wherein the first, second, third, and fourth traffic streams are transmitted from the anchor muxponder module after the anchor muxponder module has accessed a dynamically configurable mapping table and assigned the first service identification code to the first traffic stream and the second traffic stream, and the second service identification code to the third traffic stream and the fourth traffic stream.

21. The method of claim 16, wherein the first traffic stream and the second traffic stream have a first combined capacity and the third traffic stream and the fourth traffic stream have a second combined capacity that is different than the first combined capacity.

22. The method of claim 16, wherein:
the muxponder comprises a demultiplexer; and
wherein the muxponder receives, at the optical receiver, the combined optical data stream, demultiplex, with the demultiplexer the combined optical data stream into the first traffic stream, the second traffic stream, the third traffic stream, and the fourth traffic stream, and route, with the dynamically configurable digital cross-connect accessing a dynamically configurable mapping table, the first traffic stream and the second traffic stream to the a configured electrical port.

\* \* \* \* \*